US011257079B2

(12) United States Patent
Kuchkovsky Jimenez et al.

(10) Patent No.: US 11,257,079 B2
(45) Date of Patent: Feb. 22, 2022

(54) SYSTEMS, METHODS, AND INTERFACES FOR SMART CONTRACT BASED EXCHANGES VIA A BLOCKCHAIN

(71) Applicant: BANCO BILBAO VIZCAYA ARGENTARIA, S.A., Bilbao (ES)

(72) Inventors: Carlos Kuchkovsky Jimenez, Madrid (ES); Escolástico Sanchez Martinez, Madrid (ES); Ruben Chavarri Elduayen, Madrid (ES)

(73) Assignee: Banco Bilbao Vizcaya Argentaria, S.A., Madrid (ES)

( * ) Notice: Subject to any disclaimer, the term of this patent is extended or adjusted under 35 U.S.C. 154(b) by 105 days.

(21) Appl. No.: 16/399,987

(22) Filed: Apr. 30, 2019

(65) Prior Publication Data

US 2020/0349561 A1 Nov. 5, 2020

(51) Int. Cl.
*G06Q 20/38* (2012.01)
*G06F 16/23* (2019.01)
*G06F 40/18* (2020.01)

(52) U.S. Cl.
CPC ....... *G06Q 20/389* (2013.01); *G06F 16/2365* (2019.01); *G06F 16/2379* (2019.01); *G06F 40/18* (2020.01)

(58) Field of Classification Search
CPC .............. G06Q 20/389; G06F 16/2379; G06F 16/2365; G06F 40/18
See application file for complete search history.

(56) References Cited

U.S. PATENT DOCUMENTS 7,383,272 B2 6/2008 Krishnan et al.
10,133,758 B2 11/2018 Krishnan et al.
(Continued)

FOREIGN PATENT DOCUMENTS

WO 2019072289 4/2019

OTHER PUBLICATIONS

T. Tateishi, S. Yoshihama, N. Sato and S. Saito, "Automatic smart contract generation using controlled natural language and template," in IBM Journal of Research and Development, vol. 63, No. 2/3, pp. 6:1-6:12, Feb. 20, 2019. (Year: 2019).*
(Continued)

*Primary Examiner* — Abdulmajeed Aziz
(74) *Attorney, Agent, or Firm* — ALG Intellectual Property, LLC

(57) ABSTRACT

An exemplary system includes a blockchain system that includes a blockchain, a smart contract template, and a smart contract generated based on the smart contract template, the smart contract executable to facilitate, by way of the blockchain, exchanges between parties to the smart contract. The system further includes an interface system communicatively coupled to the blockchain system and configured to perform a set of operations to provide an interface to the blockchain system, the set of operations including receiving a user input from an application executed on a user computing device, translating the user input to a call to the blockchain system, and issuing the call to the blockchain system. The blockchain system is configured to perform, based on the call and the smart contract, an action on the blockchain that represents an exchange between the parties to the smart contract.

14 Claims, 41 Drawing Sheets

(56) References Cited

U.S. PATENT DOCUMENTS

| | | | | |
|---|---|---|---|---|
| 2005/0165654 | A1* | 7/2005 | Westcott | G06Q 30/0625 |
| | | | | 705/26.4 |
| 2006/0259381 | A1* | 11/2006 | Gershon | G06Q 40/06 |
| | | | | 705/35 |
| 2018/0253539 | A1* | 9/2018 | Minter | H04W 12/069 |
| 2019/0034404 | A1* | 1/2019 | Anderson | G06Q 40/025 |
| 2019/0108140 | A1 | 4/2019 | Deshpande | |
| 2020/0042939 | A1* | 2/2020 | Padmanabhan | G06F 40/157 |

OTHER PUBLICATIONS

Dapp Builder website. dappbuilder.io, Feb. 2019 (Year: 2019).*
SquadX. Screen captures from YouTube video clip entitled "Blockchain for Google Sheet and Google Form: A new blockchain Add-on," 10 pages, uploaded on Apr. 16, 2019 by "SquadX Innovations". Retrieved from Internet: <http://www.youtube.com/watch?v=5VM5hxtNi-c>. (Year: 2019).*
Openlaw. "The Future of Derivatives: An End-to-End, Legally Enforceable Option Contract Powered by Ethereum". Consensys Media. Dec. 5, 2018. (Year: 2018).*
Boardwalktech, https://www.boardwalktech.com/ as accessed on Apr. 30, 2019.
Boardwalktech & Oracle Blockchain Cloud Service Demo, https://www.youtube.com/watch?time_continue=11&v=jiEPEgaNNpw as accessed on Apr. 30, 2019.
International Search Report and Written Opinion received in International Application No. PCT/IB2020/054106, dated Jun. 2, 2020.

* cited by examiner

| | File Edit View Insert Format Data Tools Add-ons Help SpreadChain | | | |
|---|---|---|---|---|
| | A | B | C | Catalogue of Suppliers |
| 1 | REF | PRODUCT | QUANTITY | Supplier 1<br>Contact Information |
| 2 | A-AGL-001 | Cement normal | | |
| 3 | A-AGL-002 | Cement white | | Supplier 2<br>Contact Information |
| 4 | A-AGL-003 | Lime | | |
| 5 | A-AGR-005 | Cast | | Supplier 3<br>Contact Information |
| 6 | B-AGR-006 | Mortar | | |
| 7 | B-AGR-007 | Mortar teak | | |
| 8 | B-AGR-008 | Sand | | |
| 9 | | | | |

Fig. 11

| | File Edit View Insert Format Data Tools Add-ons Help SpreadChain |  |  |  |
|---|---|---|---|---|
| | A | B | C | D | E |
| 1 | REF | PRODUCT | QUANTITY | PRICE | TOTAL |
| 2 | A-AGL-001 | Cement normal | 0 | 18.30 | 0 |
| 3 | A-AGL-002 | Cement white | 0 | 33.50 | 0 |
| 4 | A-AGL-003 | Lime | 0 | 9.00 | 0 |
| 5 | A-AGR-005 | Cast | 0 | 5.40 | 0 |
| 6 | B-AGR-006 | Mortar | 0 | 11.80 | 0 |
| 7 | B-AGR-007 | Mortar teak | 0 | 13.00 | 0 |
| 8 | B-AGR-008 | Sand | 0 | 3.40 | 0 |
| 9 | | | | TOTAL | 0 |

Fig. 12

| | File Edit View Insert Format Data Tools Add-ons Help SpreadChain |  |  |  |
|---|---|---|---|---|
| | A | B | C | D | E |
| 1 | REF | PRODUCT | QUANTITY | PRICE | TOTAL |
| 2 | A-AGL-001 | Cement normal | 10 | 18.30 | 183.00 |
| 3 | A-AGL-002 | Cement white | 0 | 33.50 | 0 |
| 4 | A-AGL-003 | Lime | 0 | 9.00 | 0 |
| 5 | A-AGR-005 | Cast | 0 | 5.40 | 0 |
| 6 | B-AGR-006 | Mortar | 0 | 11.80 | 0 |
| 7 | B-AGR-007 | Mortar teak | 5 | 13.00 | 65.00 |
| 8 | B-AGR-008 | Sand | 0 | 3.40 | 0 |
| 9 | | | | TOTAL | 248.00 |

Fig. 13

| | File Edit View Insert Format Data Tools Add-ons Help SpreadChain | | | Manage Orders |
|---|---|---|---|---|
| | A | B | C | PAID |
| | | | | 1508893244437048574 |
| 1 | REF | PRODUCT | QUANTITY | CONFIRMED |
| 2 | A-AGL-001 | Cement normal | 10 | 1511361751318212686 |
| 3 | A-AGL-002 | Mortar teak | 5 | EMITTED |
| 4 | | | | 1511362006185961613 |
| 5 | | | | NEW —1806 |
| 6 | | | | 1513691935636560999 |
| 7 | | | | |
| 8 | | | | Accept |
| 9 | | | | |

Fig. 19

| | File Edit View Insert Format Data Tools Add-ons Help SpreadChain | | Manage Orders |
|---|---|---|---|
| | A | B | C |
| | | | NEW 1513688463435447179 |
| 1 | REF | PRODUCT | QUANTITY |
| 2 | A-AGL-001 | Cement normal | 10 |
| | | | READY 1513691608625667805 |
| 3 | A-AGL-002 | Cement white | 0 |
| 4 | A-AGL-003 | Lime | 0 |
| | | | EMITTED 1513691766383489474 Pay |
| 5 | A-AGR-005 | Cast | 0 |
| 6 | B-AGR-006 | Mortar | 0 |
| 7 | B-AGR-007 | Mortar teak | 5 |
| | | | ACCEPTED 1513691935636560999 Confirm Receipt |
| 8 | B-AGR-008 | Sand | 0 |
| 9 | | | |

Fig. 22

| | File Edit View Insert Format Data Tools Add-ons Help SpreadChain | | | Manage Orders |
|---|---|---|---|---|
| | A | B | C | NEW |
| | | | | 1513688463435447179 |
| 1 | REF | PRODUCT | QUANTITY | READY |
| 2 | A-AGL-001 | Cement normal | 10 | 1513691608625667805 |
| 3 | B-AGR-007 | Mortar teak | 5 | EMITTED |
| 4 | | | | 1513691766383489474 |
| 5 | | | | Pay |
| 6 | | | | EMITTED |
| 7 | | | | 1513691935636560999 |
| 8 | | | | Pay |
| 9 | | | | |

Fig. 29

| | File Edit View Insert Format Data Tools Add-ons Help SpreadChain | | Manage Orders |
|---|---|---|---|
| | A | B | C |
| | REF | PRODUCT | QUANTITY |
| 1 | A-AGL-001 | Cement normal | 10 |
| 2 | B-AGR-007 | Mortar teak | 5 |
| 3 | | | |
| 4 | | | |
| 5 | | | |
| 6 | | | |
| 7 | | | |
| 8 | | | |
| 9 | | | |

Manage Orders

NEW
1513688463435447179

READY
1513691608625667805

EMITTED
1513691766383489474
Pay

PAID — 3206
1513691935636560999

Fig. 32

| | File Edit View Insert Format Data Tools Add-ons Help | SpreadChain | | Manage Orders |
|---|---|---|---|---|
| | A | B | C | NEW |
| 1 | ID | RECEIVER | TOTAL | 151368846343544 7179 |
| 2 | 151369200 | U0007 | 248.00 | READY |
| 3 | | | | 151369160862566 7805 |
| 4 | | | | EMITTED |
| 5 | | | | 151369176638348 9474 |
| 6 | | | | ( Pay ) —3206 |
| 7 | | | | PAID |
| 8 | | | | 151369193563656 0999 |
| 9 | | | | |

Fig. 33

| | A | B | C |
|---|---|---|---|
| 1 | PUT option | | |
| 2 | | | |
| 3 | Operation | Buy ▽ | |
| 4 | Underlying | Asset Name ▽ | |
| 5 | Notional | 100 | |
| 6 | Strike | 10.00 | |
| 7 | Expiration Date | 2019-04-03 | |
| 8 | Premium/Quote (optional) | 9.50 | |
| 9 | | RFQ | |
| 10 | | | |
| 11 | | | |

File  Edit  View  Insert  Format  Data  Tools  Add-ons  Help   SpreadChain

Catalogue

Counterparty Identifier
Counterparty Contact Info
+Call:
+Put:

Fig. 35

| | File | Edit | View | Insert | Format | Data | Tools | Add-ons | Help | SpreadChain | | |
|---|---|---|---|---|---|---|---|---|---|---|---|---|
| | A | | B | | | | C | | | | | |
| 1 | Order Detail | | | | | | | | | | | |
| 2 | Order Identifier | | 1554280696718003396 | | | | | | | | | |
| 3 | Buyer Name | | Buyer Name | | | | | | | | | |
| 4 | Seller name | | Seller Name | | | | | | | | | |
| 5 | Status | | Requested | | | | | | | | | |
| 6 | Last Update | | 2019-04-03 08:38:19 | | | | | | | | | |
| 7 | | | | | | | | | | | | |
| 8 | Proposal Detail | | | | | | | | | | | |
| 9 | Concept | | Current Proposal | | | | New Proposal | | | | | |
| 10 | Type | | PUT | | | | PUT | | | | | |
| 11 | Operation | | Buy ▽ | | | | Buy ▽ | | | | | |
| 12 | Underlying | | Asset Name ▽ | | | | Asset Name ▽ | | | | | |
| 13 | Notional | | 100 | | | | 100 | | | | | |
| 14 | Strike | | 10.00 | | | | 10.00 | | | | | |
| 15 | Expiration Date | | 2019-04-03 | | | | 2019-04-03 | | | | | |
| 16 | Quote | | 9.50 | | | | 9.50 | | | | | |
| 17 | | | Confirm ~3612 | | | | New Proposal ~3614 | | | | | |

Notifications

PUT Asset Name ~3606
[Requested] ~3608
View detail

View their proposals ~3610

Fig. 36

| | A | B | C | D | E | F | G |
|---|---|---|---|---|---|---|---|
| 1 | ORDER DETAIL | | | | | | |
| 2 | Order Identifier | 1554280696718003396 | | | | | |
| 3 | Buyer Name | Buyer Name | | | | | |
| 4 | Seller name | Seller Name | | | | | |
| 5 | Status | Closed | | | | | |
| 6 | Last Update | 2019-04-03 08:38:19 | | | | | |
| 7 | | | | | | | |
| 8 | Product Detail | | | | | | |
| 9 | PUT option | | | | | | |
| 10 | | | | | | | |
| 11 | Operation | Buy | | | | | |
| 12 | Underlying | Asset Name | | | | | |
| 13 | Notional | 100 | | | | | |
| 14 | Strike | 10.00 | | | | | |
| 15 | Expiration Date | 2019-04-03 | | | | | |
| 16 | Quote | 9.50 | | | | | |
| 17 | | | | | | | |

Fig. 37

| | A | B | C | D | E | F | G |
|---|---|---|---|---|---|---|---|
| 18 | Proposals Detail | | | | | | |
| 19 | Asset Type | Product | Amount | Strike | Due Date | Premium | Status |
| 20 | PUT | Asset Name | 100 | 10 | 2019-04-03 | 9.50 | Confirmed |
| 21 | | | | | | | |
| 22 | Payment Detail | | | | | | |
| 23 | Payment ID | From | To | Amount | Status | Date | |
| 24 | 1554280777... | U0002 | U0007 | 950 | Sent | 2019-04-03 8:39 | |
| 25 | | | | | | | |
| 26 | Event Detail | | | | | | |
| 27 | Event ID | From | Price | Concept | Date | | |
| 28 | 1554280782... | from | 7 | concept | 2019-04-03 8:39 | | |
| 29 | | | | | | | |
| 30 | Payoff Detail | | | | | | |
| 31 | Payoff ID | From | To | Amount | Status | Date | |
| 32 | 1554280784... | U0007 | U0002 | 300 | Sent | 2019-04-03 8:39 | |
| 33 | | | | | | | |
| 34 | | | | | | | |

SYSTEMS, METHODS, AND INTERFACES FOR SMART CONTRACT BASED EXCHANGES VIA A BLOCKCHAIN

BACKGROUND INFORMATION

Blockchain technology uses cryptographic principles to create a series of time-stamped and unchangeable data records, i.e., a chain of blocks of data that is commonly referred to as a blockchain. A blockchain is managed across multiple computers in a decentralized architecture, making the blockchain useful as a distributed data store, such as a digital ledger that is used to record transactions across many computers in a manner that prevents undetected retroactive modification of recorded transactions.

However, implementation and use of blockchain technology can be difficult and typically requires a blockchain developer to build a blockchain system that is customized to a specific use or application. The developer may also need to build one or more custom interfaces to the blockchain system (e.g., a custom off-chain interface and/or a custom user interface to the blockchain system). Such conventional requirements have slowed the implementation of blockchain technology.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 6-33 illustrate exemplary graphical user interface views according to principles described herein.

FIGS. 35-38 illustrate exemplary graphical user interface views according to principles described herein.

DETAILED DESCRIPTION

Figure 1:
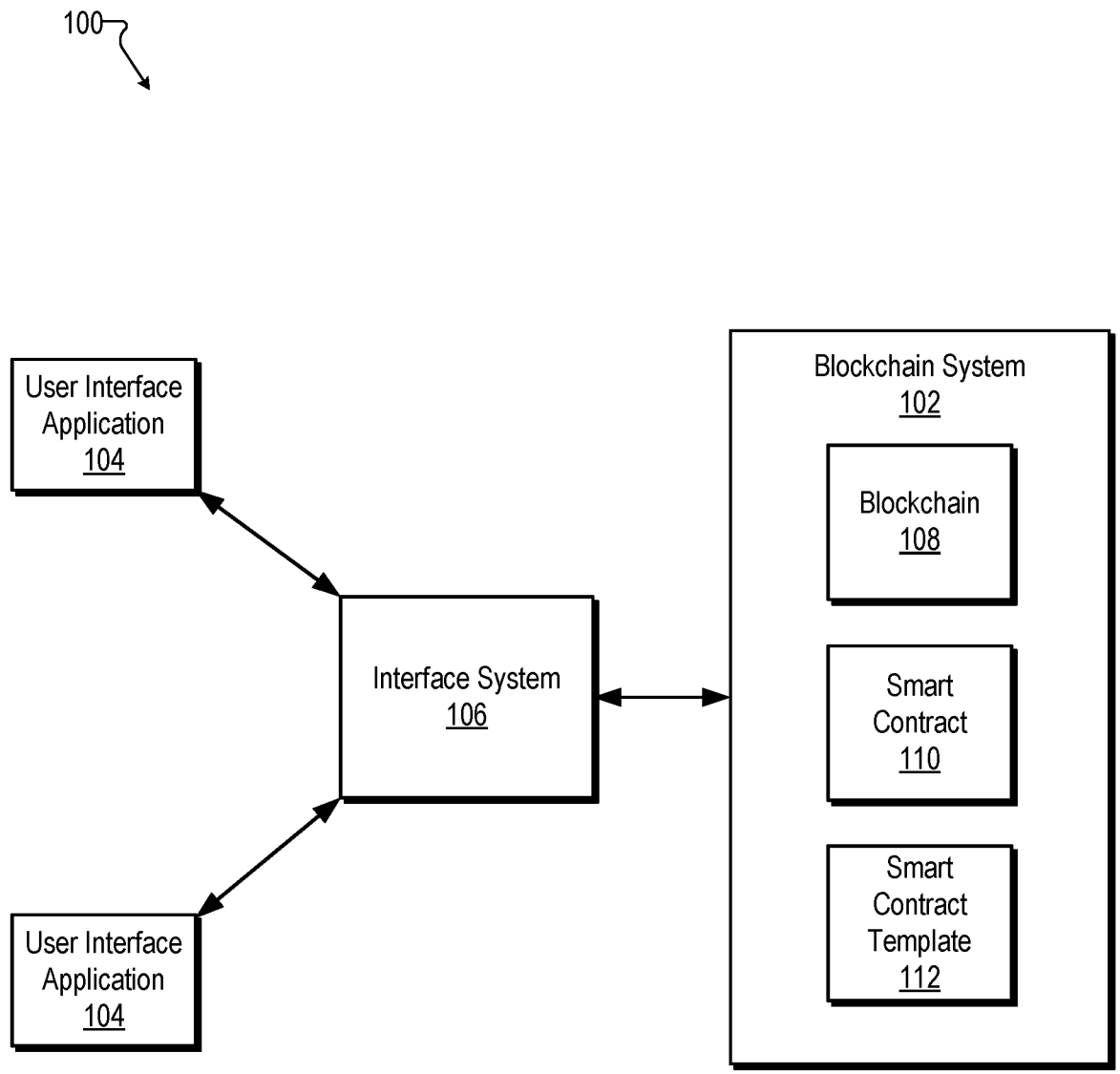
FIG. 1 illustrates an exemplary configuration in which a blockchain system and an interface to the blockchain system are implemented according to principles described herein.

Systems, methods, and interfaces for smart contract based exchanges via a blockchain are described herein. Systems, methods, and interfaces described herein may facilitate creation of a smart contract between parties, such as a smart contract that is generated based on a smart contract template included in a blockchain system. Systems, methods, and interfaces described herein may additionally or alternatively facilitate exchanges, by way of a blockchain, between parties to a smart contract such as a smart contract that has been generated based on a smart control template included in a blockchain system.

An exchange between parties to a smart contract by way of a blockchain may include an exchange of anything between the parties in accordance with the terms of the smart contract. For example, an exchange may include an exchange of information, data, messages, goods, and/or services between the parties in accordance with the terms of the smart contract. Examples of such exchanges may include, without limitation, a placement of a new order, an acceptance of the new order, a fulfillment of the new order, an issuance of an invoice for the new order, and a payment of the invoice for the new order. Exchanges may additionally or alternatively include exchanges of information between the parties by way of a blockchain, such as exchanges of information about a placement of a new order, an acceptance of the new order, a fulfillment of the new order, an issuance of an invoice for the new order, and a payment of the invoice for the new order. Exchanges may additionally or alternatively include exchanges of information between potential parties to a smart contract by way of a blockchain, such as exchanges of information related to negotiation of terms of the smart contract (e.g., offers, counteroffers, etc.). Exemplary exchanges between parties and potential parties to a smart contract by way of a blockchain are described in more detail herein.

An exchange between parties or potential parties to a smart contract may be considered to be made by way of a blockchain for one or more reasons. As an example, an exchange between parties to a smart contract may be recorded as data in the blockchain (e.g., by executing the smart contract to create a data record representing the exchange) such that the recorded data is accessible to the parties by way of the blockchain. For example, a first party to a smart contract may perform an action in accordance with the terms of the smart contract. In response, computing code included in the smart contract may be executed to create and add, to the blockchain, a data record representative of the action performed by the first party. A second party to the smart contract may access the blockchain, including the new data record representative of the action of the first party. In this manner, information associated with the smart contract, such as information about performance of actions in accordance with the smart contract, may be exchanged between the parties to the smart contract by way of the blockchain. An exchange between potential parties to a smart contract may be similarly recorded as data in a blockchain such that the recorded data is accessible to the potential parties by way of the blockchain.

In certain embodiments, a blockchain system may maintain data representative of a set of smart contract templates that may be accessed by users of the blockchain system via an interface system that provides an interface between the users and the blockchain system. Through the interface system, users of the blockchain system may access and use a smart contract template to create a smart contract between the users, which users may be considered parties to the smart contract. To illustrate, a first user, who may be a provider of goods or services, may access and use, via the interface system to the blockchain system, a smart contract template to create an offer to provide goods or services in accordance with certain terms. A second user, who may be looking to purchase goods or services, may access and use, via the interface system to the blockchain system, the smart contract template to find the provider's offer and to agree to purchase the goods or services from the provider in accordance with the provider's offer. In response to these actions by the first and second users, a smart contract may be generated based on the smart contract template and may represent an agreement between the first and second users.

A smart contract template may include computing code configured to be executed to interact with a blockchain and/or an interface to the blockchain in accordance with terms defined by the smart contract template. A smart contract that is generated based on the smart contract template may include computing code that is generated based on the computing code included in the smart contract template. The computing code of the smart contract is executable by a computing device to perform one or more actions on a blockchain and/or to interact with an interface to the blockchain in accordance with the terms of the smart contract. Examples of such actions are described herein.

A smart contract template may define one or more user interface features. For example, a smart contract template may define a presentation layout of content in a graphical user interface, such as a specific tabular presentation layout for a tabular graphical user interface. A smart contract that is generated based on the smart contract template may define the same user interface features. Examples of user interface features that may be defined by a smart contract and/or smart contract template are described herein.

A smart contract template maintained by a blockchain system may be used by users of the blockchain system to create one or more distinct smart contracts between various users. For example, the smart contract template described above may be used by the first and second users of the blockchain system to create a first smart contract that is based on the smart contract template. The same smart contract template may also be used by a third user and a fourth user of the blockchain system to create a second smart contract that is based on the smart contract template. The first and second smart contracts may define distinct and/or different terms but may include instances of, or otherwise leverage, the same computing code and/or user interface features of the smart contract template (e.g., code for interacting with a blockchain and/or an interface to the blockchain) to implement the distinct and/or different terms.

Data representative of a smart contract may be maintained and used by a blockchain system to facilitate exchanges between parties to the smart contract by way of a blockchain. To this end, the blockchain system may be configured to perform actions on the blockchain (e.g., by executing the smart contract) that represent exchanges between the parties to the smart contract. For example, the blockchain system may be configured to generate and add, to the blockchain, new entries (e.g., new data blocks) representative of exchanges between the parties to the smart contract. The addition of a new entry to the blockchain makes data in the new entry (e.g., data representative of an exchange) accessible to the parties to the smart contract by way of the interface system. For example, in response to requests received from the interface system, the blockchain system may access and read, from the blockchain, data representative of exchanges between the parties to the smart contract. The blockchain system may be configured to perform similar actions on a blockchain that represent exchanges between potential parties to a smart contract, such as exchanges related to negotiation of terms of the smart contract.

Systems, methods, and interfaces described herein may provide one or more benefits and/or improvements to conventional blockchain technology such as technology for implementing and/or interfacing with a blockchain. As an example, a blockchain system that maintains one or more smart contract templates as described herein may allow users of the blockchain system to access and use the smart contract templates to create smart contracts, without needing a blockchain developer to create the smart contracts. As another example, an interface system may provide an interface to a blockchain system, as described herein, which interface may allow users of the blockchain system (e.g., people, computing applications, etc. using the blockchain system) to conveniently and intuitively access and interact with one or more smart contract templates and/or smart contracts without needing a blockchain developer to create the interface.

Accordingly, in certain examples, systems, methods, and interfaces described herein may provide a hub or marketplace for smart contract templates and/or smart contracts that are accessible by users to conveniently create and agree to smart contracts and/or to perform exchanges, by way of a blockchain, in accordance with the smart contracts. These and/or other benefits and/or advantages that may be provided by systems, methods, and interfaces described herein will be made apparent by the following detailed description.

FIG. 1 illustrates an exemplary configuration 100 in which a blockchain system and an interface to the blockchain system are implemented. As shown, configuration 100 includes a blockchain system 102 communicatively coupled to user interface applications 104 by way of an interface system 106. Blockchain system 102, user interface applications 104, and interface system 106 may include or be implemented by any suitable number and/or configuration of computing devices having computer-readable memory storing computer-readable instructions and processors configured to execute the instructions to perform operations described herein. Such a configuration of computing devices may be referred to as a computing system.

The computing system may include computing devices implementing any suitable combination or sub-combination of elements of configuration 100. For example, the computing system may include one or more computing devices that implement blockchain system 102, user interface applications 104, interface system 106, or any combination or sub-combination thereof. In certain implementations, for instance, blockchain system 102 may be implemented by one set of computing devices, each user interface application 104 may be implemented by a distinct user computing device, and interface system 106 may be implemented by another set of computing devices. In some implementations, interface system 106 may be distributed across distinct computing devices. For example, a part of interface system 106 may be implemented by each distinct user computing device and another part of interface system 106 may be implemented by the set of computing devices that implements blockchain system 102 and/or by another set of computing devices.

Interface system 106 may be communicatively coupled to blockchain system 102 and user interface applications 104 using any suitable communications technologies, including network communication technologies (e.g., LAN technologies, WAN technologies, etc.), protocols (e.g., HTTP, HTTPS, gRPC, etc.), and/or any suitable interfaces, such as one or more of the interfaces described herein. As described herein, interface system 106 may be configured to translate and otherwise facilitate communications between user interface applications 104 and blockchain system 102.

Blockchain system 102 may be configured to create and maintain blockchains such as blockchain 108. To this end, blockchain system 102 may implement any suitable blockchain technologies and/or blockchain-based technologies, including proprietary or open source blockchain framework solutions. For example, blockchain system 102 may implement Hyperledger Fabric, Ethereum, NEO, EOS, Cardano, and/or any other suitable existing or future blockchain framework.

Blockchain system 102 may implement one or more smart contracts such as smart contract 110. Smart contract 110 may include computing code (e.g., one or more scripts, coded business logic, etc.) configured to be executed by a computer on a blockchain (e.g., on a blockchain-based distributed ledger). For example, computing code of smart contract 110 may be executed to add data to a blockchain (e.g., by adding a new data record to the blockchain) and/or to read data from the blockchain.

In certain implementations, smart contract 110 may represent a contract or agreement between parties to the smart contract 110. In such implementations, smart contract 110 may include computing code (e.g., a computerized transaction protocol) configured to be executed by a computer to execute the terms of a contract between the parties to the contract, such as by facilitating exchanges between the parties to the contract by way of blockchain 108. For example, smart contract 110 may perform operations on blockchain 108 to facilitate, verify, and/or enforce the negotiation and/or performance of the contract.

Blockchain system 102 may implement one or more smart contract templates such as smart contract template 112. Smart contract template 112 may include computing code (e.g., one or more scripts) configured to be executed by a computer on a blockchain (e.g., on a blockchain-based distributed ledger). For example, computing code of smart contract template 112 may be executed to add data to a blockchain (e.g., by adding a new data record to the blockchain) and/or to read data from the blockchain.

Blockchain system 102 may be configured to use smart contract template 112 to generate one or more distinct smart contracts that are based on smart contract template 112. The smart contracts that are generated based on smart contract template 112 may define distinct and/or different terms (e.g., terms of distinct contracts between various parties) but may include instances of, or otherwise leverage, the same computing code of smart contract template 112 (e.g., computing code for interacting with a blockchain) to implement the distinct and/or different terms. To illustrate, smart contract template 112 may be a template for a purchase contract and may include computing code that is configured to be executed to perform actions in accordance with the purchase contract, such as by writing to a blockchain data representative of a placement of a new order, an acceptance of the new order, a fulfillment of the new order, an issuance of an invoice for the new order, and a payment of the invoice for the new order in accordance with the purchase contract.

Users of blockchain system 102 may use smart contract template 112 to create smart contract 110 that represents a purchase contract between the users. The users may provide and agree to terms for the purchase contract and provide those terms to blockchain system 102. In response, blockchain system 102 may generate smart contract 110 based on smart contract template 112 such that smart contract 110 includes or otherwise leverages code from smart contract template 112 to represent the terms of the purchase contract between the users. Other users of blockchain system 102 may similarly use smart contract template 112 to create one or more additional smart contracts that are generated based on smart contract template 112 and represent various terms of purchase contracts between various users. Users of blockchain system 102 may conveniently create template-based smart contracts in this manner by interacting with blockchain system 102 and without needing a blockchain developer to create the smart contracts.

In certain examples, smart contract template 112 may define one or more user interface features. For example, smart contract template 112 may define a presentation layout of content in a graphical user interface, such as a specific tabular presentation layout for a tabular graphical user interface. Smart contract 110 that is generated based on smart contract template 112 may define the same user interface features. These user interface features may be accessed, by way of interface system 106, and used by user interface application 104 to present a graphical user interface in which content is presented in accordance with the user interface features defined by smart contract 110 and/or smart contract template 112.

Figure 2:
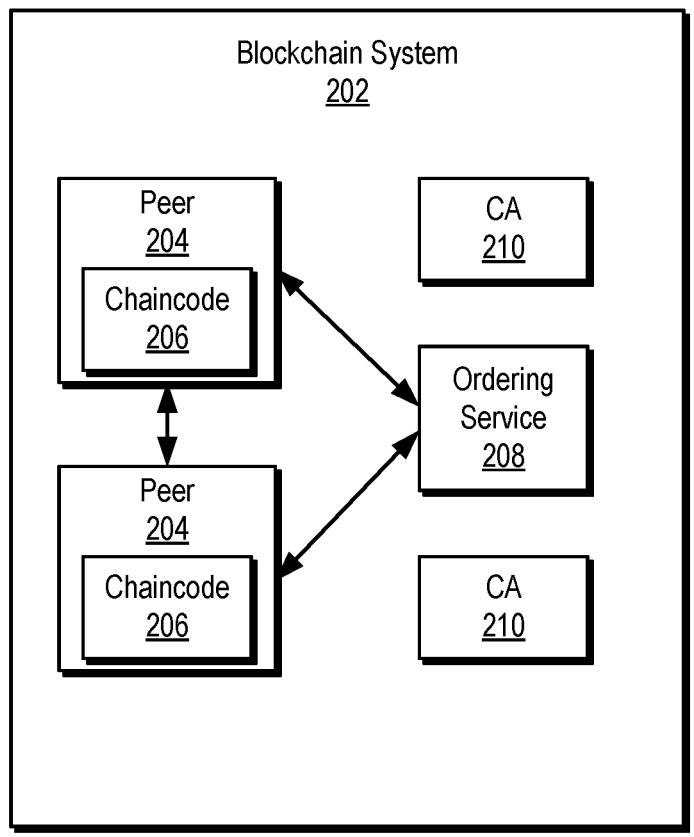
FIG. 2 illustrates an exemplary blockchain system according to principles described herein.

Blockchain system 102 may be implemented in any way suitable to provide functionality of blockchain system 102 described herein. FIG. 2 illustrates an exemplary blockchain system 202. As shown, blockchain system 202 may include peer nodes 204 (e.g., distributed computers) on which chaincode 206 is instantiated. Chaincode 206 may implement or be a form of a smart contract such as smart contract 110 that is configured to read and update a blockchain such as a blockchain-based distributed ledger (e.g., by reading and updating ledger state). Chaincode 206 may include the logic of smart contract 110.

Ordering service 208 may be configured to batch data processed by blockchain system 102. For example, ordering service 208 may collect data representative of exchanges processed by blockchain system 102 to a block. Ordering service 208 may add the block to a blockchain such that the block is distributed among all peer nodes 204 in the blockchain network.

A certificate authority (CA) 210 may be configured to control access to blockchain system 102 and/or components of blockchain system 102 by way of certificates. CA 210 may employ any suitable technologies for controlling access, such as any suitable certificate technologies, authentication technologies, authorization technologies, or any other security or access control technologies.

Blockchain system 202 represents an exemplary implementation of a blockchain system. However, a blockchain system such as blockchain system 102 may be implemented in any suitable way in other examples. Access to a blockchain system may be controlled in any suitable way and using any suitable technologies, including access control technologies integrated in the blockchain system (e.g., access technologies supported by Hyperledger Fabric) and/or external access control technologies that may be accessed and used by the blockchain system to control access to the blockchain system and/or a particular blockchain. Blockchain system 102 may be configured to provide any scope of controlled access to blockchains, including by using public and/or private blockchains and controlling access to the private blockchains.

Returning to FIG. 1, user interface application 104 may include any set of computer-executable instructions that may be executed by a user computing device (not shown in FIG. 1). For example, user interface application 104 may include a software application installed on and configured to be executed by the user computing device. The user computing device may include any computing device that may be operated by a user and that may execute user interface application 104, such as a desktop computer, a laptop computer, a mobile device, etc. The user computing device may include one or more input and output mechanisms for receiving input from a user and providing output to the user. For example, the user computing device may include a display device for displaying graphical user interface content and an input mechanism such as a touchscreen, keypad, keyboard, and/or mouse for receiving user input.

User interface application 104 may provide a user interface to a user of a user computing device. The user interface provided by user interface application 104 may be configured to be used by the user to interact with blockchain system 102 by way of user interface system 106. For example, user interface application 104 may provide a graphical user interface, which may include one or more graphical user interface views, through which the user may interact with blockchain system 102 by way of interface system 106. In certain examples, user interface application 104 may be configured to provide a tabular graphical user interface. Examples of a graphical user interface provided by user interface application 104 are described herein.

Interface system 106 may be configured to perform operations to provide an interface to blockchain system 102, such as an interface between blockchain system 102 and user interface applications 104. Such operations may be configured to facilitate generation of a smart contract based on a smart contract template and/or to facilitate exchanges between parties to a smart contract by way of a blockchain.

To facilitate generation of a smart contract based on a smart contract template, interface system 106 may facilitate exchanges between potential parties to a smart contract by way of a blockchain. For example, interface system 106 may receive a request to generate a smart contract based on a smart contract template. The request may include terms for the smart contract as agreed to by the potential parties to the smart contract. Interface system 106 may receive user request from one or more user interface applications 104 associated with one or more parties to the smart contract.

In certain examples, the request may represent an agreement reached by the parties after exchanging negotiation messages by way of a blockchain in blockchain system 102. For example, a user of a user interface application 104 may use the user interface application 104 to find and request access to a smart contract template maintained by blockchain system 102. Interface system 106 may receive the user request to access the smart contract template and may access, from blockchain system 102, and provide, to the user interface application 104 in response to the request, data representative of the smart contract template. The user interface application 104 may present the smart contract template, and the user of the user interface application 104 may view the smart contract template and accept terms proposed in the smart contract template. The user may use user interface application 104 to indicate an acceptance of the terms of the smart contract template. Interface system 105 may receive the user acceptance from user interface application 104 and provide the user acceptance to blockchain system 102. The acceptance may be a request to generate a smart contract based on the smart contract template. In response to the user acceptance, blockchain system 102 may generate a smart contract based on the smart contract template and the terms accepted by the user. In alternative examples, additional negotiations may occur, which may include one or more counteroffers being made until a party accepts a counteroffer.

Such negotiations may be exchanges between potential parties to a smart contract, i.e., parties to a negotiation of a smart contract. These exchanges may be made by way of a blockchain of blockchain system 102. For example, each negotiation and/or acceptance message received by interface system 106 and provided to blockchain system 102 may be added by blockchain system 102 to the blockchain for access by parties to the negotiation.

To facilitate exchanges between parties to a smart contract by way of a blockchain, interface system 106 may provide an interface between blockchain system 102 and user interface applications 104. The interface may include operations performed by interface system 106 to receive communications from a source, translate the communications, and provide the translated communications to a destination. For example, interface system 106 may receive user input from a user interface application 104 executed on a user computing device, translate the user input to a call to blockchain system 102, and issue the call to blockchain system 102. Blockchain system 102 is configured to perform, based on the call and the smart contract, an action on a blockchain that represents an exchange between the parties to the smart contract. The action may include adding new data representative of the exchange to the blockchain or reading data representative of the exchange from the blockchain.

Interface system 106 may employ any suitable computer interfacing technologies to provide an interface between blockchain system 102 and user interface applications 104. For example, interface system 106 may include and/or be configured to communicate with an application program interface (API) of user interface application 104 and/or an API of blockchain system 102. In certain implementations, interface system 106 may include an add-on component to user interface application 104, such as a plug-in component or other add-on component that is integrated with and/or otherwise configured to interface with user interface application 104. Interface system 106 may additionally include an API configured to provide an interface between blockchain system 102 and the add-on component to user interface application 104.

Figure 3:
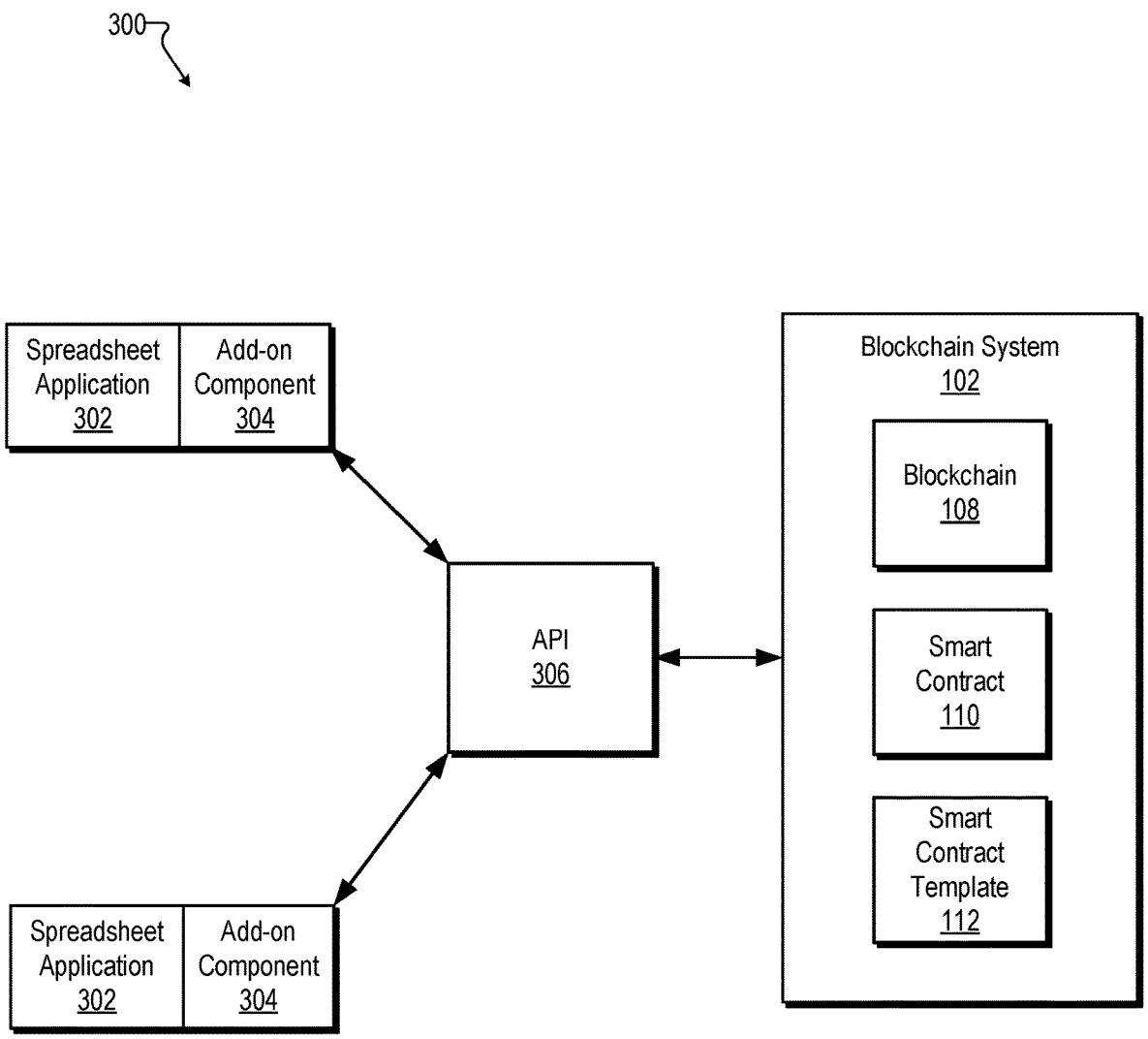
FIG. 3 illustrates another exemplary configuration in which a blockchain system and an interface to the blockchain system are implemented according to principles described herein.

FIG. 3 illustrates an exemplary configuration 300 in which user interface application 104 is a spreadsheet application 302 and interface system 106 includes an add-on component 304 to spreadsheet application 302 and an API 306 configured to interface add-on component 304 with blockchain system 102. API 306 may be configured to interface with add-on component 304 and blockchain system 102 using any suitable computer interface technologies (e.g., communications and/or software interface technologies). Similarly, add-on component 304 may be configured to interface with spreadsheet application 302 and API 306 using any suitable computer interface technologies (e.g., communications and/or software interface technologies). For example, add-on component 304 may include or interface with an API of spreadsheet application 302.

Spreadsheet application 302 may include any application configured to be executed by a computer to provide an interactive spreadsheet in which data may be represented in tabular form. For example, data may be represented in rows and columns that make up a table of cells in a tabular graphical user interface. Spreadsheet application 302 may perform operations on and/or store data entered in cells of the table.

Spreadsheet application 302 may include any suitable interactive spreadsheet application, including a spreadsheet application readily available in the market, a proprietary spreadsheet application, or any spreadsheet application configured to perform spreadsheet operations. For example, spreadsheet application 302 may be a Microsoft EXCEL spreadsheet application, a Google SHEETS spreadsheet application, or any other $3^{rd}$ party spreadsheet application.

Add-on component 304 may be in any suitable form to be added on to (e.g., integrated within) spreadsheet application 302. For example, add-on component 304 may be a plugin component that includes a set of scripts and that is integrated as an add-on to spreadsheet application 302. Add-on component 304 may be configured to interface with spreadsheet application 302, including accessing and using functionality of spreadsheet application 302.

Together, spreadsheet application 302 and add-on component 304 may be referred to as an enhanced spreadsheet application. The enhanced spreadsheet application may provide a tabular, cell-based graphical user interface configured to receive user input, such as by receiving user input in a cell of the cell-based graphical user interface. Add-on component 304 and/or API 306 may translate the received user input to one or more calls to blockchain system 102 and issue the call(s) to blockchain system 102, which is configured to perform one or more actions on a blockchain based on the call(s). Add-on component 304 and/or API may also receive blockchain data from blockchain system 102, translate the blockchain data, and provide data representative of the blockchain data for presentation by spreadsheet application 302 (e.g., in one or more cells of the tabular cell-based graphical user interface). The enhanced spreadsheet application may present the tabular graphical user interface in accordance with user interface features defined by a smart contract, a smart contract template, and/or add-on component 304.

In certain examples, add-on component 304 may be configured to transparently (e.g., transparently to spreadsheet application 302 and/or a user of spreadsheet application 302) communicate with API 306 to persist actions performed. For example, add-on component 304 may interact with smart contracts, which are maintained by blockchain system 102, by way of API 106. In certain implementations, add-on component 304 may perform translation operations and issue calls to smart contract by way of API 306.

API 306 may be configured as a communication layer that functions as a proxy between add-on components 304 and blockchain system 102. To this end, API 306 may be configured to receive communications, translate the communications, and provide the translated communications. For example, API 306 may receive a communication from an add-on component 304, translate the communication to a call to blockchain system 102, and issue the call to blockchain system 102. As another example, API 306 may receive a communication from API 306, translate the communication, and provide the translated communication to an add-on component 304.

Configuration 300 illustrates one exemplary implementation of configuration 100. Other suitable implementations of configuration 100 may be used in other examples.

Blockchain system 102 and interface system 106 may provide a computing platform that facilitates smart contract based exchanges via a blockchain. A user interface application, such as user interface application 104, spreadsheet application 302, or other suitable user interface application may be configured to access the computing platform to initiate operations by the computing platform to facilitate smart contract based exchanges via a blockchain.

Figure 4:
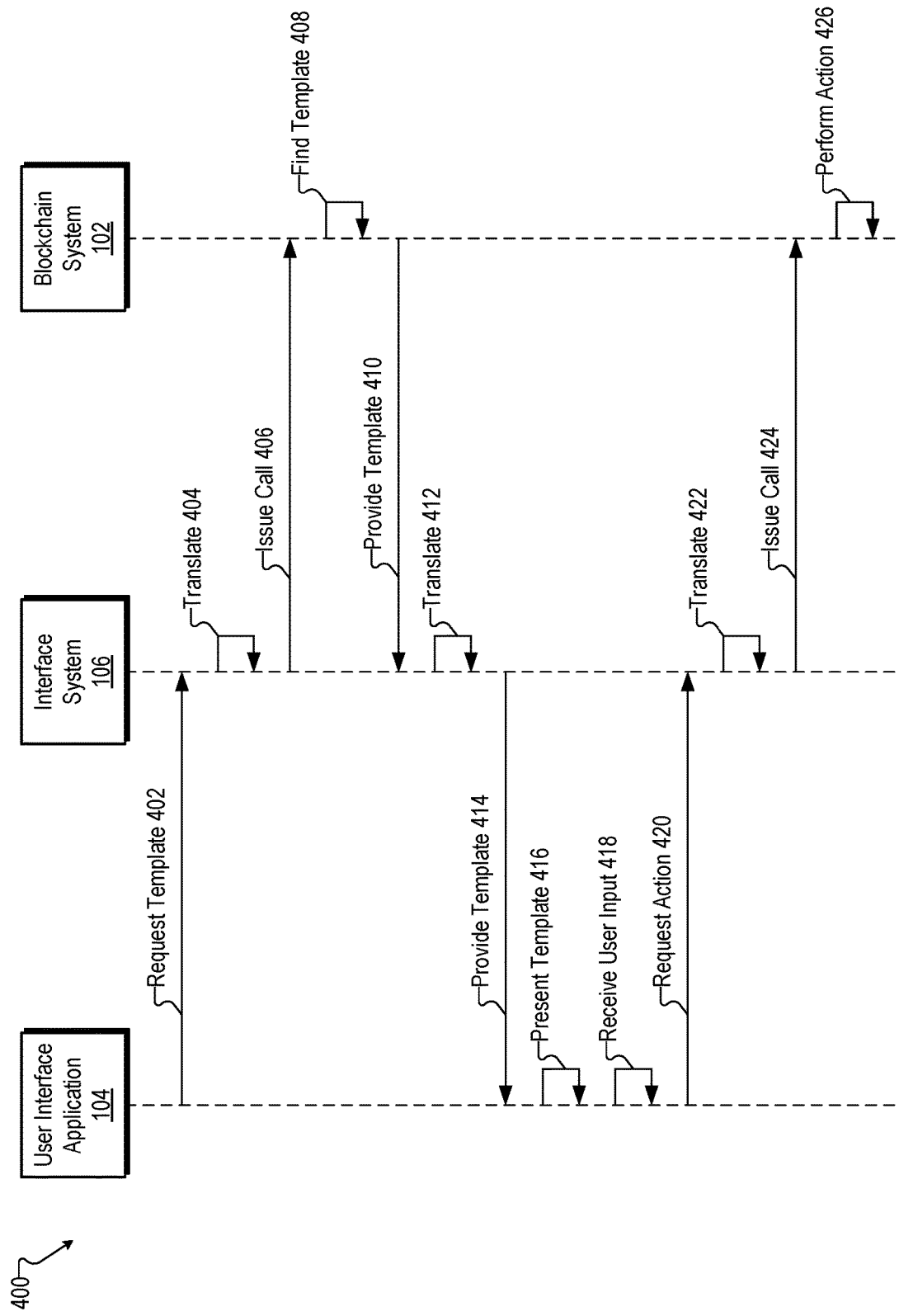
FIGS. 4-5 illustrate exemplary operation flows according to principles described herein.

FIG. 4 illustrates an exemplary operation flow 400 related to a smart contract template maintained by blockchain system 102. As shown, interface system 106 may receive a request for a smart contract template from user interface application 104 (operation 402). The request may be provided by user interface application 104 in response to user input received by user interface application 104 and indicating a request to access one or more smart contract templates maintained by blockchain system 102. The request may include any information identifying a particular smart contract template and/or a set of parameters that may be used to search for a matching smart contract template.

Interface system 106 translates the request into a call to blockchain system 102 (operation 404) and issues the call to blockchain system 102 (operation 406). Blockchain system 102 finds the requested smart contract template (operation 408) from among the smart contract templates maintained by blockchain system 102 and provides data representative of the smart contract template to interface system 106 (operation 410). Interface system 106 translates the message received from blockchain system 102 (operation 412) and provided the data representative of the smart contract template to user interface application 104 (operation 414).

User interface application 104 presents the smart contract template (operation 416). A user of user interface application 104 may view the presented smart contract template and provide user input to user interface application 104 related to the smart contract template. User interface application 104 may receive the user input (operation 418). The user input may include input defining terms to be included in an offer or a smart contract to be generated based on the smart contract template, a counteroffer to be generated based on the smart contract template, a request to generate a smart contract based on the smart contract template, and/or any other input related to the smart contract template. Based on the user input, user interface application 104 may generate and send a request for an action to interface system 106 (operation 420).

Interface system 106 may receive the request for an action (operation 420), translate the request to a call to blockchain system 102 (operation 422), and issue the call to blockchain system 102 (operation 424). Blockchain system 102 may perform the requested action (operation 426).

If the requested action is to generate an offer based on the smart contract template, blockchain system 102 may generate an offer based on the smart contract template. As an example, a provider of goods or services may access and select the smart contract template for use to generate an offer to provide goods or services in accordance with certain terms based on a smart contract generated from the smart contract template. In this example, the request for action may be a request to generate an offer based on the smart contract template, and blockchain system 102 may generate an offer in accordance with the smart contract template and the terms received from the provider. This may include performing an action on a blockchain, such as by adding data representative of the offer to the blockchain. The offer may then be maintained by blockchain system 102 and accessible to users of blockchain system 102 by way of user interface applications 104 and interface system 106.

As another example, a person looking to purchase goods or services may access and use the smart contract template and/or offer to use to create a smart contract based on the smart contract template. In this example, the request for action may be a request to generate a smart contract, and blockchain system 102 may generate the smart contract based on the smart contract template and terms provided by users who have agreed to the terms (e.g., a provider of goods or services and a buyer of the goods or services). This may include performing an action on a blockchain, such as by adding data representative of the smart contract and/or generation of the smart contract to the blockchain. The smart contract may then be maintained and used by blockchain system 102 to facilitate exchanges between the parties to the smart contract.

Figure 5:
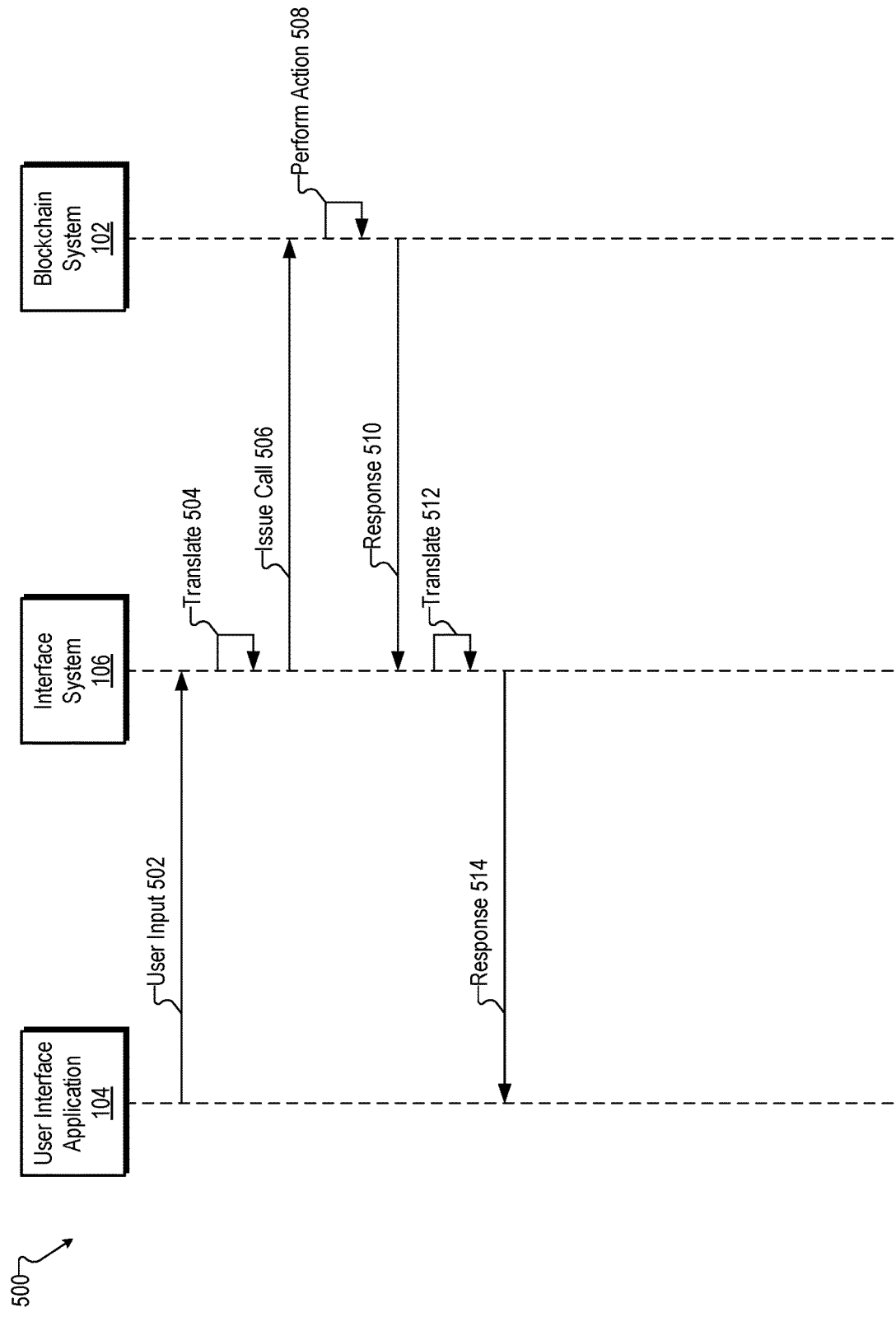

FIG. 5 illustrates an exemplary operation flow 500 related to a smart contract template maintained by blockchain system 102. As shown, interface system 106 may receive user input 502 from user interface application 104 (operation 502). The user input may represent one or more inputs received by user interface application 104 from a user of user interface application 104. For example, the user input may represent input received in one or more cells of a tabular graphical user interface provided by user interface application 104, a selection of a menu option from a set of menu options provided by user interface application 104, and/or any other input received by user interface application 104.

Based on the user input, user interface application 104 may generate and send a request for an action to interface system 106 (operation 502). Interface system 106 may receive the request for an action (operation 502), translate the request to a call to blockchain system 102 (operation 504), and issue the call to blockchain system 102 (operation 506). Blockchain system 102 may receive and perform the requested action (operation 508). This may include blockchain system 102 (e.g., a smart contract of blockchain system 102) performing one or more actions on a blockchain maintained by blockchain system 102, such as adding data (e.g., a new entry) to the blockchain or reading data from the blockchain. Such data added to the blockchain may represent and/or facilitate an exchange between parties to a smart contract.

Blockchain system 102 may provide and interface system 106 may receive a response (operation 510). The response may indicate the action performed by blockchain system 102 and/or a result of the action. For example, the response may indicate whether the action was successfully performed. Interface system 106 may translate the response (operation 512) and provide the response to user interface application (operation 514).

The user input received by interface system 106 and the corresponding action performed by blockchain system 102 may be any suitable corresponding user input and action, including any of those described herein. Examples of such corresponding user inputs and actions may include, without limitation, a start session request and a start session action, a login request and an authentication action, a request to access a catalogue (e.g., a catalogue of smart contracts, smart contract templates, suppliers, supplier products, etc.) and a catalogue access action, a request to access suppliers and an action to provide supplier information (e.g., a catalogue of suppliers), a request to access a product catalogue and an action to provide product information (e.g., product information for a supplier), a request to place an order and an action to generate the order, a request to access orders and an action to provide information about orders (e.g., a list of orders and statuses of the orders for a particular supplier or purchaser), and a request to update a status of an order and an action to update the status of the order (e.g., a request to accept a new order and an action to update the status of the new order to accepted, a request to confirm receipt of an order and an action to update the status of the order to confirmed, a request to send an invoice for an order and an action to update the status of the order to invoice emitted, a request to pay an invoice and an action to update the status of the invoice to paid, etc.).

The performance of such actions may include performing actions on a blockchain to record the actions. The data recorded to the blockchain may represent exchanges between parties to a smart contract. The data recorded to the blockchain may include any suitable information and/or security protections, including, for example, descriptions of the actions, timestamps of when the actions are performed, users who requested actions, cryptographic information such as hash keys, user signatures of exchanges, and/or any other information.

Interface system 106 may be configured to translate requests to calls that can be issued to invoke actions by blockchain system 102. Interface system 106 may be configured to invoke any suitable set of calls. Examples of such calls may include, without limitation, a call to login, a call to get users, a call to get users by user identifier, a call to get sellers, a call to get a catalogue of sellers, a call to get a catalogue of a seller, a call to add a new order, a call to get orders (e.g., with filter parameters), a call to update an order, a call to update an article of an order, a call to add an invoice to an order, and a call to close an order (e.g., by changing the status of the order to "fulfilled" or "emitted").

The above-described inputs, actions, and action calls are illustrative only. Interface system 106 and blockchain system 102 may be configured to process any suitable inputs, actions, and action calls as may suit a particular implementation.

An example of a tabular graphical user interface that may be provided by user interface application 102 and interface system 106 (e.g., by spreadsheet application 302 and add-on component 304 of interface system 106) will now be described with reference to FIGS. 6-33, which illustrate exemplary graphical user interface (GUI) views according to principles described herein. A computing platform formed by interface system 106 and blockchain system 102 may be configured to receive data representative of user inputs that are received by way of the tabular GUI, including any of the exemplary user inputs described with reference to FIGS. 6-33, translate the user inputs into calls to blockchain system 102, and issue the calls to blockchain system 102, which may perform one or more actions corresponding to the calls to facilitate smart contract based exchanges via a blockchain.

Figure 6:
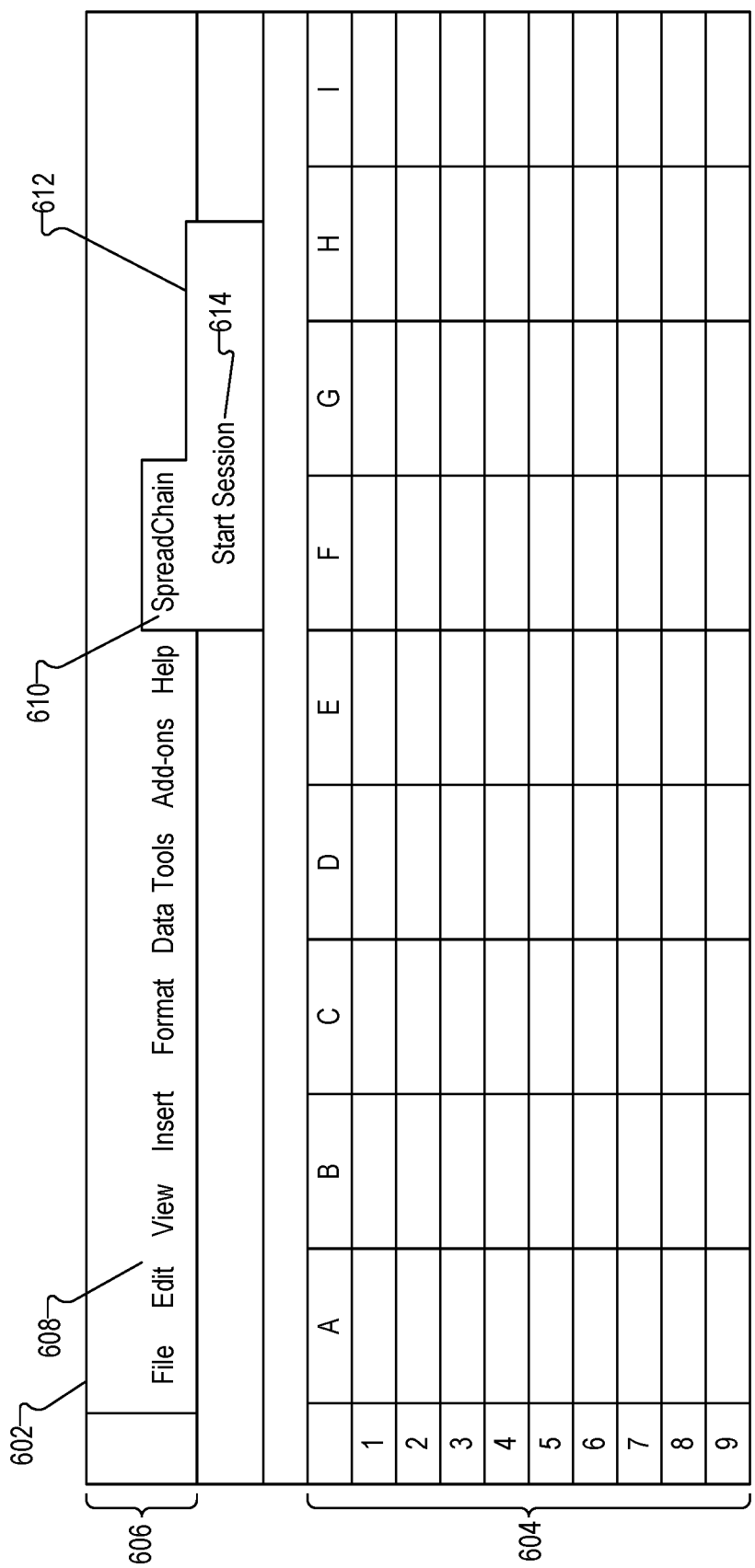

FIG. 6 illustrates a GUI view 602 of a tabular graphical user interface. As shown, GUI view 602 may include a table 604 formed by columns (e.g., columns A-I) and rows (e.g., rows 1-9). The table 604 includes a grid of cells forms by the columns and rows. Data, such as alphanumeric characters, equations, etc., may be entered and stored in the cells of the table 604. The table 604 may be part of an interactive spreadsheet application in certain examples.

GUI view 602 may further include a menu header section 606 that includes a menu 608 of options for interacting with the interactive GUI. As shown, the menu 608 of options includes a menu option 610 titled "SpreadChain," which menu option 610 is configured to be selected by a user to access operations of a computing platform formed by interface system 106 and blockchain system 102. In certain examples, the "SpreadChain" menu option 610 may be integrated into GUI view 602 by add-on component 304 and may be referred to as an add-on menu option.

GUI view 602 illustrates a submenu 612 that may be displayed when the "SpreadChain" menu option 610 is selected. The submenu 612 may include one or more submenu options configured to be selected by a user to access operations of the computing platform formed by interface system 106 and blockchain system 102. The particular options displayed in the submenu 612 may be selected for display based on context and/or status of a session with blockchain system 102. In GUI view 602, for example, a single option 614 for starting a session with blockchain system 102 is displayed in the submenu 612 because there is no active session between the application user interface 104 and blockchain system 102 when GUI view 602 is displayed. In response to a user selection of option 614, interface system 106 (e.g., add-on component 304 and/or API 306) may receive the user input requesting a session, translate the user input into a call, and issue the call to blockchain system 102, which may perform one or more operations to initiate a session with blockchain system 102.

Figure 7:
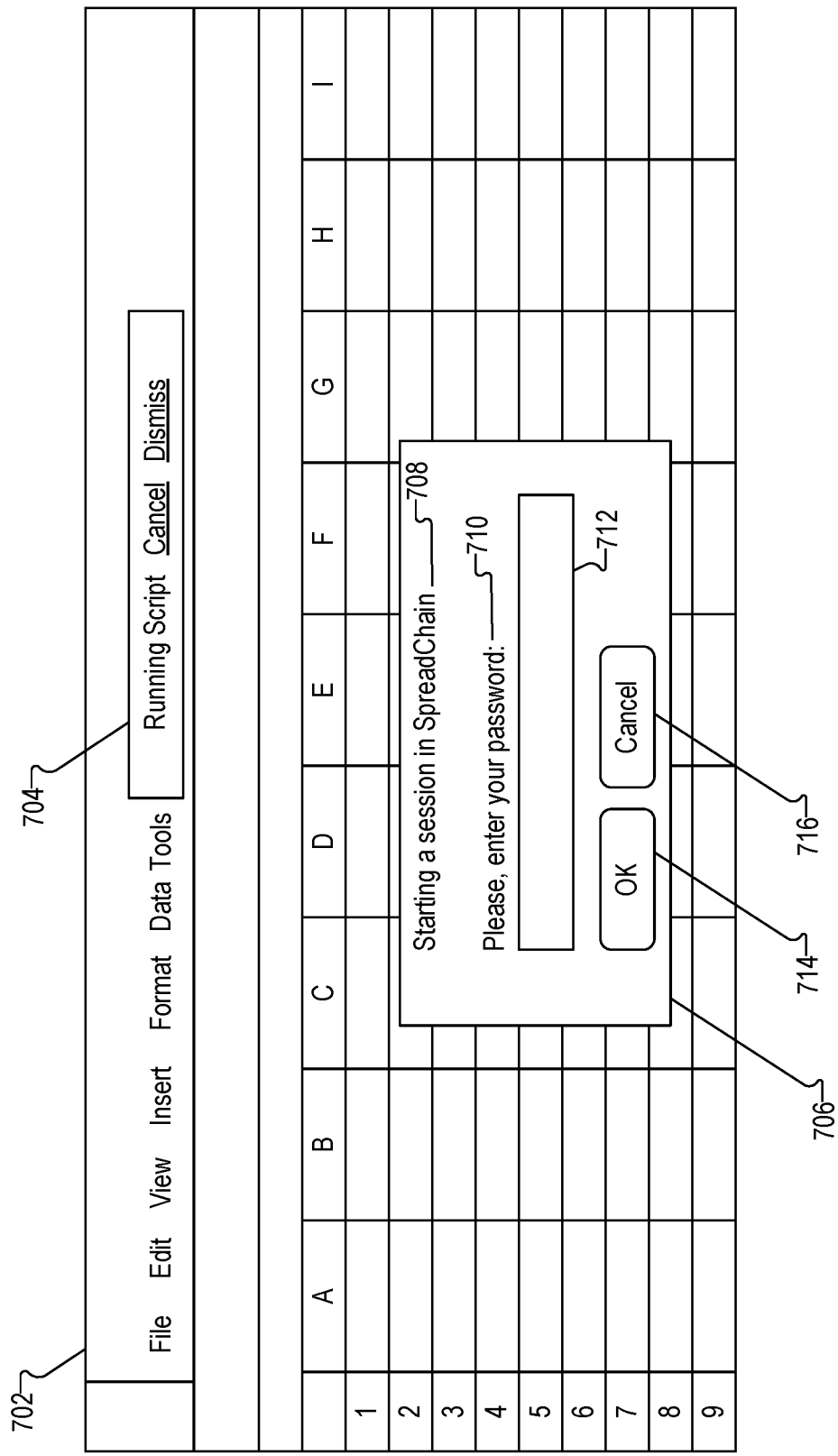

FIG. 7 illustrates a GUI view 702 of a tabular graphical user interface that may be displayed in response to a user selection of option 614 to start a session with blockchain system 102. As shown, GUI view 702 may include a status overlay 704 indicating that a script is running. The status overlay 704 may include user selectable options to cancel the script or dismiss the status overlay 704. GUI view 702 may further include an input overlay 706 that provides information 708 indicating that a session is being started, instructions 710 for the user to enter his or her password, an entry field 712 into which the password may be entered, and user selectable options to continue 714 or cancel 716 the operation.

Figure 8:
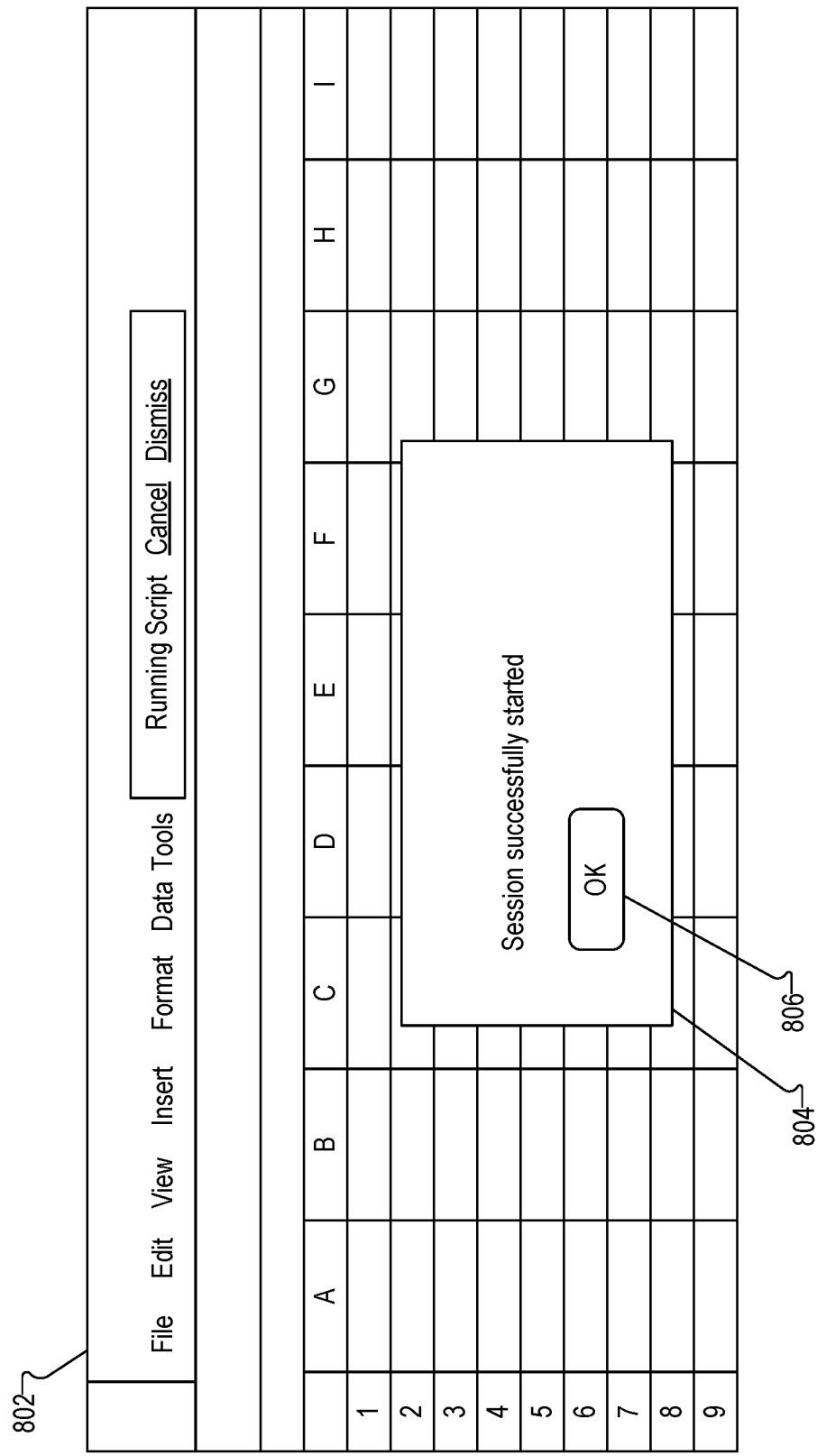

FIG. 8 illustrates a GUI view 802 of a tabular graphical user interface that may be displayed after a session has been started with blockchain system 102. As shown, GUI view 802 may include an overlay 804 indicating that a session has been successfully started with blockchain system 102. Overlay 804 may include an option 806 configured to be selected by the user to dismiss overlay 804.

Figure 9:
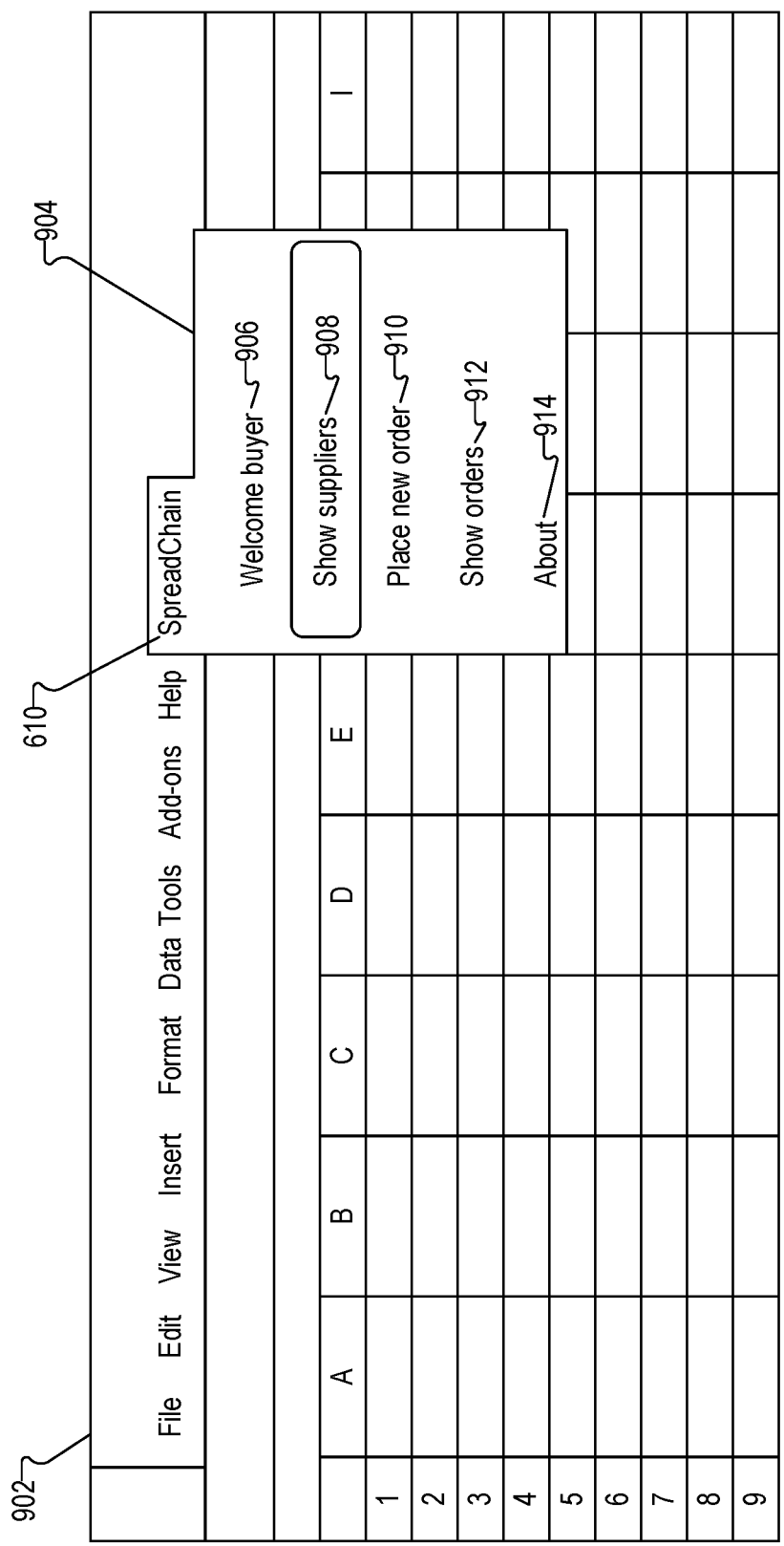

FIG. 9 illustrates a GUI view 902 of a tabular graphical user interface that may be displayed during an active session with blockchain system 102 and in response to a user selection of menu option 610. As shown, GUI view 902 may display a submenu 904 in response to the "SpreadChain" menu option 610 being selected. The submenu 904 may include one or more submenu options configured to be selected by a user to access operations of the computing platform formed by interface system 106 and blockchain system 102.

The particular options displayed in the submenu 904 may be selected based on context and/or status of a session with blockchain system 102. In GUI view 902, for example, multiple submenu options are displayed because there is an active session between the application user interface 104 and blockchain system 102 when GUI view 902 is displayed. The submenu options are also selected based on the user or a role of the user who logged in to start the session with blockchain system 102. For example, the user may have a buyer role with the computing platform formed by interface system 106 and blockchain system 102, and the submenu options may be selected based on the user having the buyer role. In GUI view 902, the submenu options include an option 906 to welcome the buyer (e.g., which may provide information about the buyer, the buyer role, buyer account information, etc.), an option 908 to show suppliers (e.g., to access information about users having supplier roles with the platform, suppliers with whom the user has entered into agreements recorded as smart contracts, etc.), an option 910 to place a new order (e.g., with a supplier with whom the user has entered into an agreement recorded as a smart contract), an option 912 to show orders (e.g., to show information about orders that the user has placed), and an option 914 to access information about the computing platform.

Figure 10:
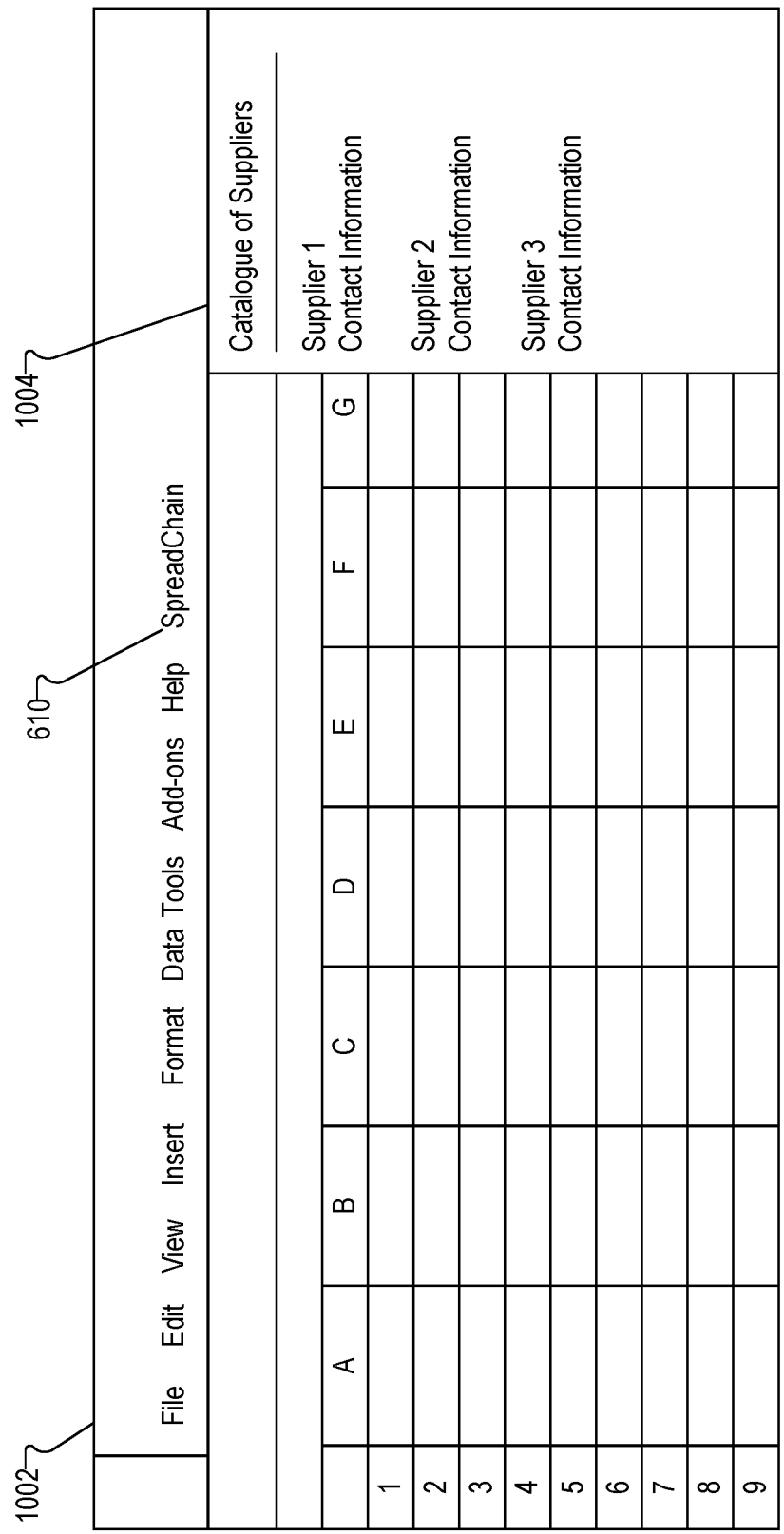

FIG. 10 illustrates a GUI view 1002 of a tabular graphical user interface that may be displayed in response to a user selection of the submenu option 908 to show suppliers. As shown, GUI view 1002 may include an overlay 1004 in which information about suppliers is displayed. The supplier information displayed in the overlay 1004 may be selected based on any suitable parameters. For example, the supplier information may include information for suppliers with which the user has an established relationship, such as suppliers with which the user has entered into agreements that are represented as smart contracts maintained by blockchain system 102. As another example, the supplier information may include information for any other group of suppliers registered with blockchain system 102.

The supplier information in overlay 1004 may be arranged in a catalogue list of entries that are configured to be selected by the user to access more information about the suppliers. In response to a user selection of one of the entries, information about the supplier represented by the entry may be displayed.

FIG. 11 illustrates a GUI view 1102 of a tabular graphical user interface that may be displayed in response to a user selection of a supplier in overlay 1004. As shown, GUI view 1102 may include information about products offered by the selected supplier. The information, which may be displayed within cells of a table of cells in GUI view 1102, may include any information about products offered by the selected supplier. In GUI view 1102, the product information includes reference identifiers for the products (column A) and descriptions of the products (column B). The product information may also include quantity information (column C), pricing information and/or any other information about the products.

FIG. 12 illustrates a GUI view 1202 of a tabular graphical user interface in which product information may be displayed. GUI view 1202 is similar to GUI view 1102 but with overlay 1004 removed from the display. As shown, GUI view 1202 includes pricing information (column D) and total prices (column E). The total prices are calculated by multiplying product quantities by product per-unit prices. In GUI view 1202, the total prices are set to zero because the product quantities are set to zero.

To place a product order with the selected supplier, a user may input product quantities into one or more cells in the quantity column (column C). FIG. 13 illustrates a GUI view 1302 of a tabular graphical user interface in which the user has input quantity information into certain cells in column C. As shown, cell C2 includes a quantity of "10" products described as "Cement normal," and cell C7 includes a quantity of "5" products described as "Mortar teak." GUI view 1302 also displays updated total price information based on the updated product quantities (e.g., a total of 183.00 in cell E2, and a total of 65.00 in cell E7) and overall total amount for the products (e.g., a total of 248.00 in cell E9). After entering product quantities in GUI view 1302, the user may select the "SpreadChain" menu option 610.

Figure 14:
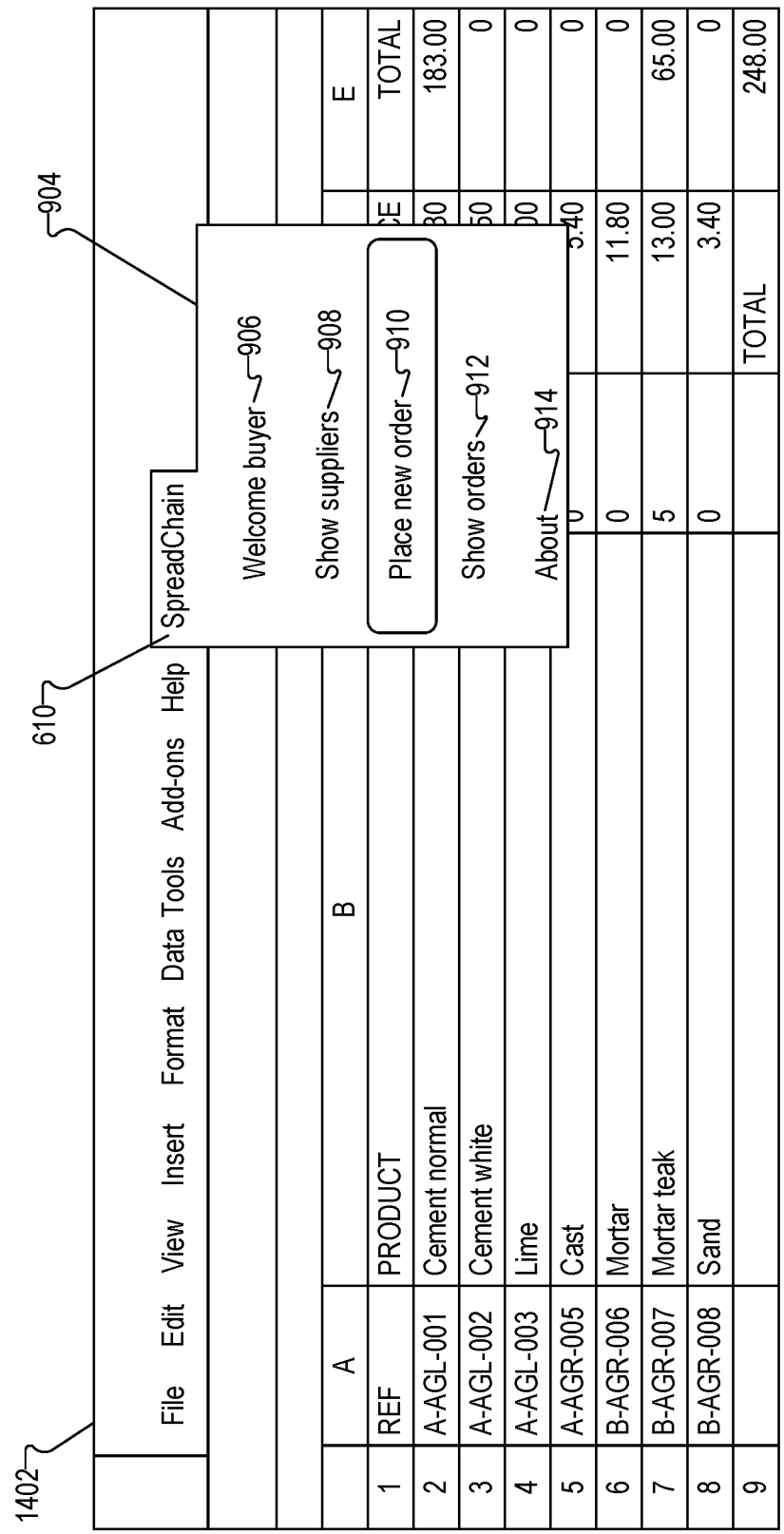

FIG. 14 illustrates a GUI view 1402 of a tabular graphical user interface that may be displayed in response to a user selection of menu option 610. As shown, GUI view 1402 may include submenu 904 having submenu options 906, 908, 910, 912, and 914 (previously described with reference to FIG. 9). The user may select submenu option 910 to place a new order with the selected supplier based on the quantities entered into column C in GUI view 1302.

Figure 15:
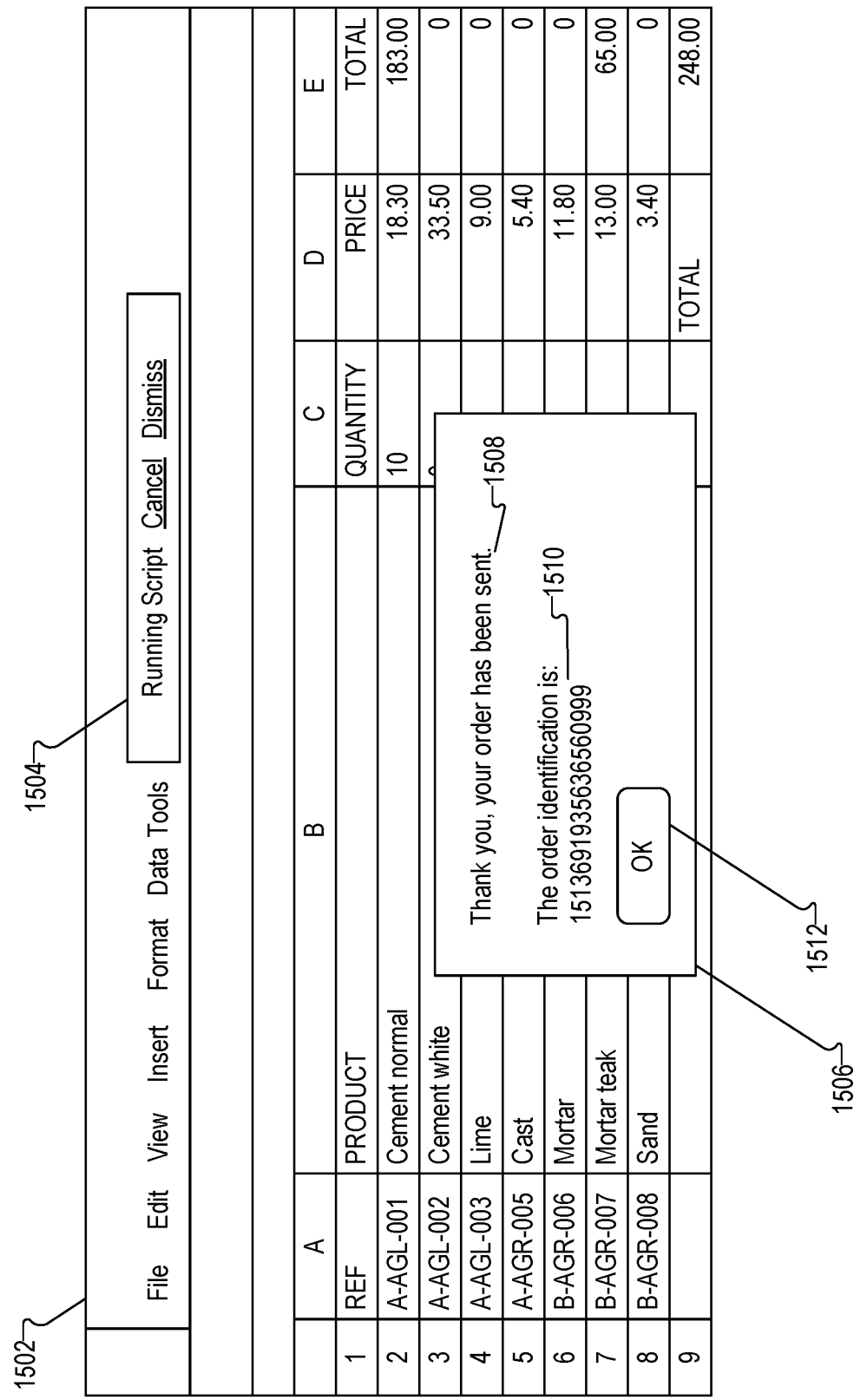

FIG. 15 illustrates a GUI view 1502 of a tabular graphical user interface that may be displayed in response to placement of a new order. As shown, GUI view 1502 may include a status overlay 1504 indicating that a script is running. The status overlay 1504 may include user selectable options to cancel the script or dismiss the status overlay 1504. GUI view 1502 may further include an overlay 1506 including information 1508 indicating that the order has been sent and information 1510 indicating the order identifier. Overlay 1506 may include an option 1512 configured to be selected by the user to dismiss overlay 1506.

In response to a user selection of option 910 in GUI view 1502, interface system 106 (e.g., add-on component 304 and/or API 306) may receive the user input requesting creation of new order, translate the user input into a call, and issue the call to blockchain system 102, which may perform one or more operations to generate a new order. For example, blockchain system 102 may generate a new order based on the user input, such as by executing a smart contract between the user and the supplier to generate the new order in accordance with the terms of the smart contract and the user input received from the user. This may include adding data representative of the new order to a blockchain, including a unique order identifier that is generated to identify the order. When the data representative of the new order is added to the blockchain, the data becomes accessible to parties to the smart contract, which in this example include the user who placed the order and the selected supplier.

Figure 16:
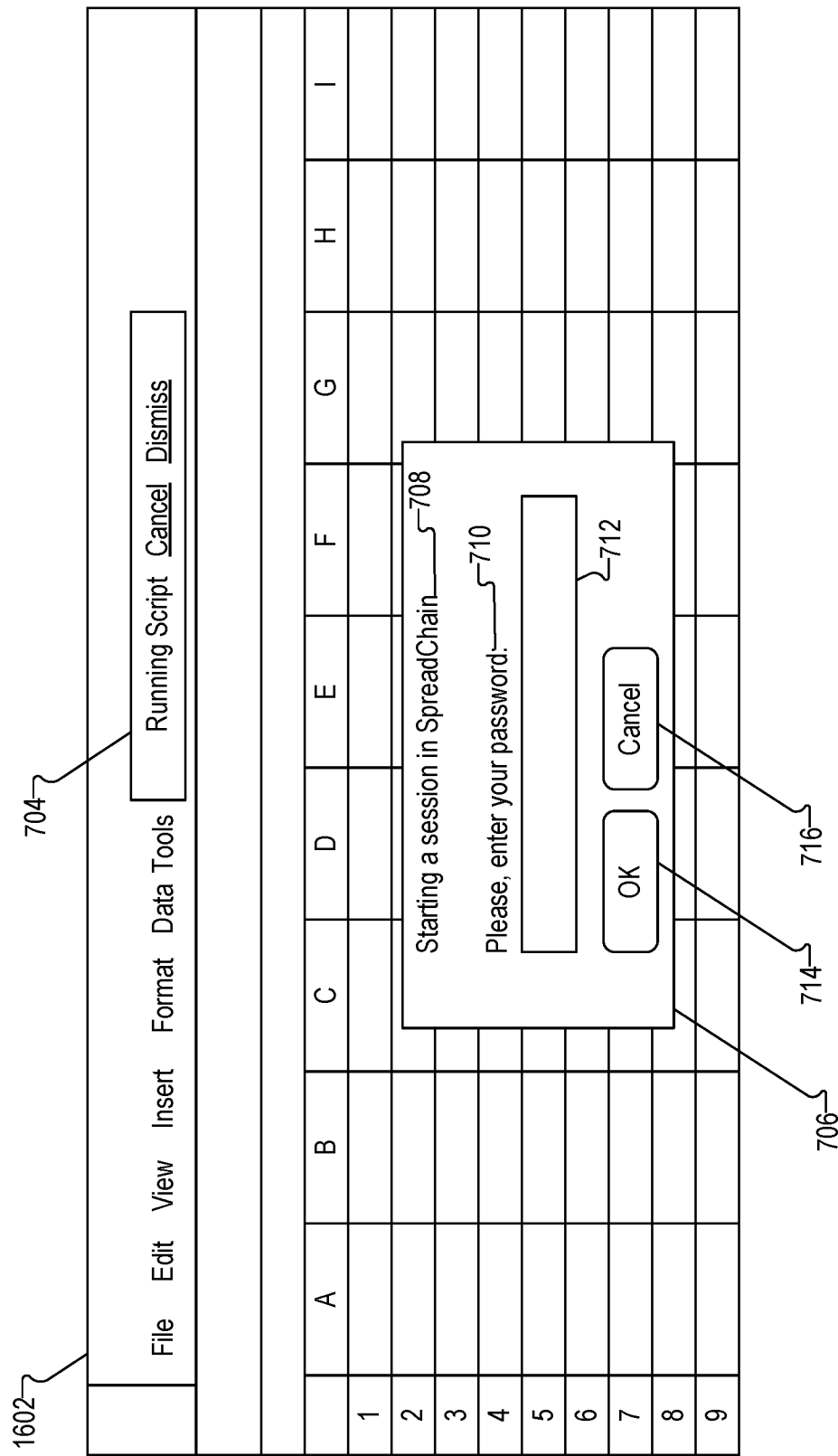

FIGS. 16-20 illustrate GUI views that may be presented to the supplier after the new order has been generated. FIG. 16 illustrates a GUI view 1602 of a tabular graphical user interface that may be displayed in response to the supplier selecting to start a session with blockchain system 102. GUI view 1602 the same as GUI view 700 except that GUI view 1602 is presented to the supplier rather than to the buyer.

Figure 17:
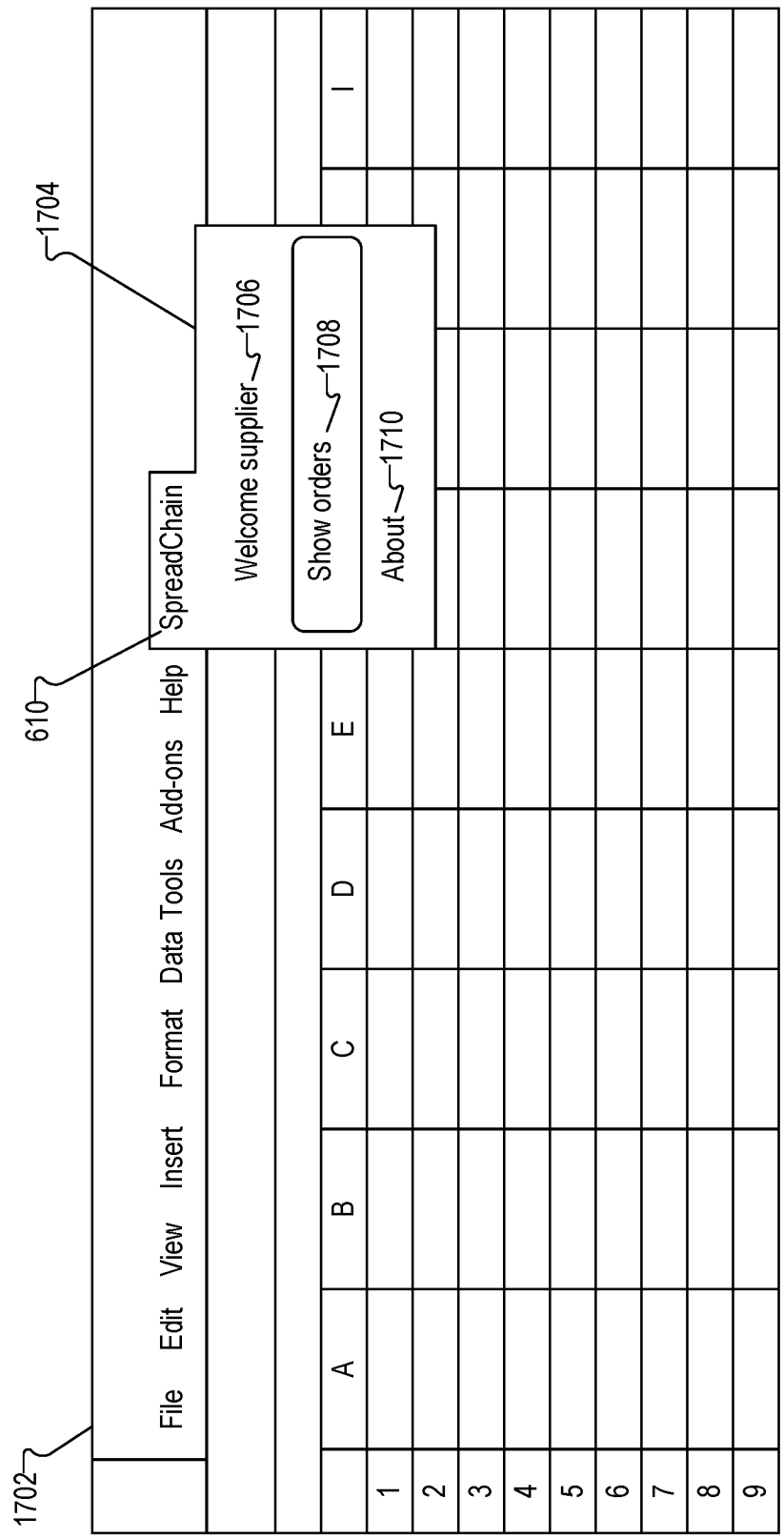

FIG. 17 illustrates a GUI view 1702 of a tabular graphical user interface that may be displayed during an active session with blockchain system 102 and in response to a user selection of menu option 610. As shown, GUI view 1702 may display a submenu 1704 in response to the "Spread-Chain" menu option 610 being selected. The submenu 1704 may include one or more submenu options configured to be selected by a user to access operations of the computing platform formed by interface system 106 and blockchain system 102.

The particular options displayed in the submenu 1704 may be selected based on context and/or status of a session with blockchain system 102. In GUI view 1702, for example, multiple submenu options are displayed because there is an active session between the application user interface 104 and blockchain system 102 when GUI view 1702 is displayed. The submenu options are also selected based on the user or a role of the user who logged in to start the session with blockchain system 102. For example, the user may have a supplier role with the computing platform formed by interface system 106 and blockchain system 102, and the submenu options may be selected based on the user having the supplier role. In GUI view 1702, the submenu options include an option 1706 to welcome the supplier (e.g., which may provide information about the supplier, the supplier role, supplier account information, etc.), an option 1708 to show orders (e.g., to show information about orders that the supplier has received), and an option 1710 to access information about the computing platform.

Figure 18:
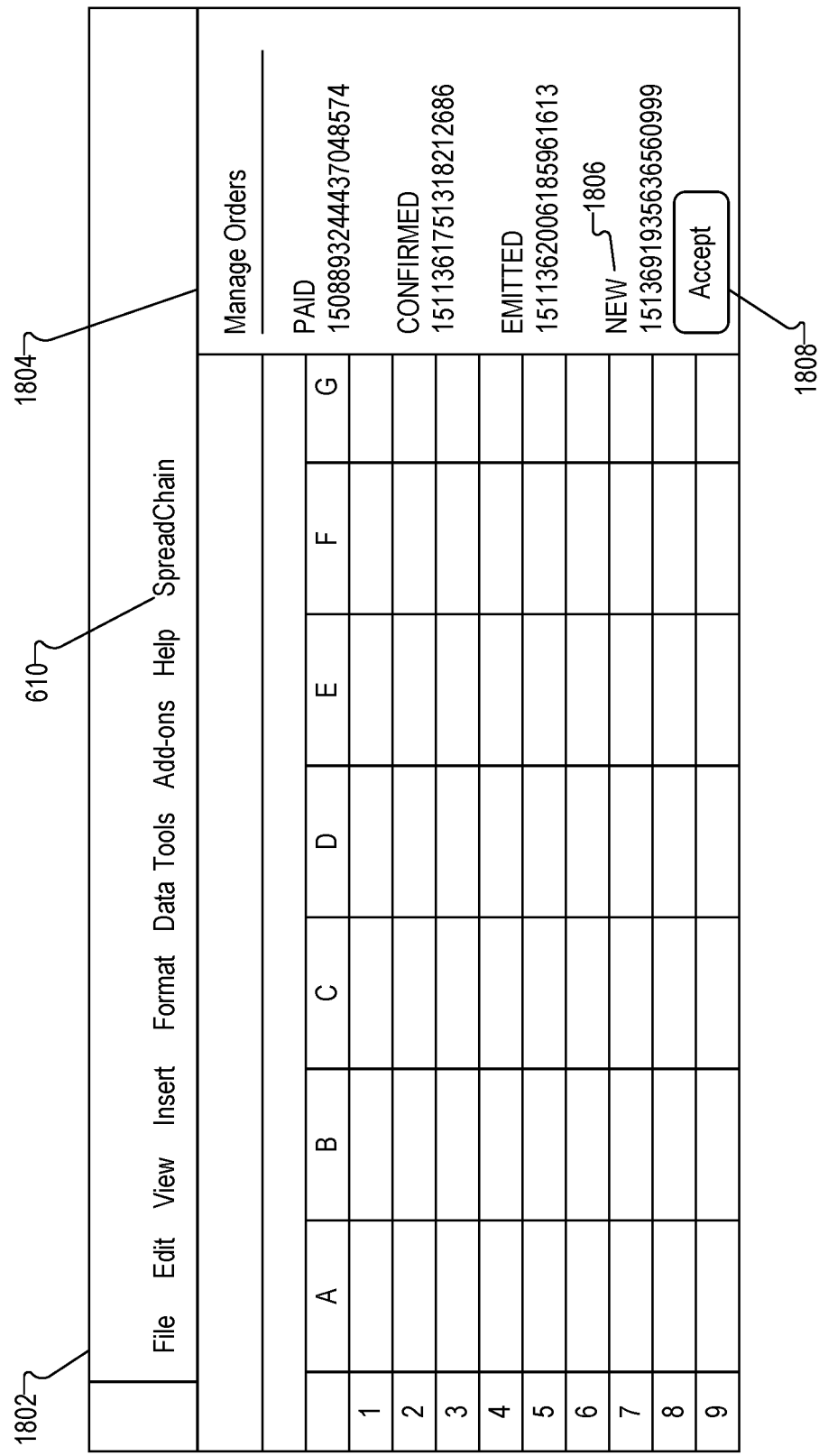

FIG. 18 illustrates a GUI view 1802 of a tabular graphical user interface that may be displayed in response to a user selection of the submenu option 1708 to show orders. As shown, GUI view 1802 may include an overlay 1804 in which information about orders is displayed. The order information displayed in the overlay 1804 may include information for orders that have been received by the supplier.

The information about the orders may be accessed from the blockchain maintained by blockchain system 102. For example, in response to the user selection of the option 1708 to show orders, user interface system 106 (e.g., add-on component 304 and/or API 306) may receive the user input requesting information about orders, translate the user input into a call, and issue the call to blockchain system 102, which may perform one or more operations to access and return the information about orders. For example, blockchain system 102 may retrieve orders associated with the supplier and provide data representative of the retrieved orders to interface system 106, which may provide the data representative of the orders to user interface application 104 for presentation to the user in GUI view 1802.

The order information in overlay 1804 may be arranged in a catalogue list of entries that are configured to be selected by the user to access more information about the orders. In response to a user selection of one of the entries, information about the order represented by the entry may be displayed.

The information about orders may indicate statuses of the orders. For example, for the orders represented in overlay 1804 in GUI view 1802, exemplary statuses of orders include a paid status, a confirmed status, an emitted status, and a new status. In certain examples, statuses of new, accepted, confirmed, ready, emitted, and paid may be available for orders. For example, a newly placed or received order may be assigned a new status, an order that has been accepted by a supplier may be assigned an accepted status, an order that has been confirmed by a buyer (e.g., an accepted order that has been confirmed by the buyer) may be assigned a confirmed status, an order that is ready to be fulfilled or that has been fulfilled may be assigned a ready status, an order for which an invoice has been sent may be assigned an emitted status, and an order for which the invoice has been paid may be assigned a paid status. These examples of order statuses are illustrative only. Any suitable order statuses may be used in other examples.

In overlay 1804 shown in GUI view 1802, a particular entry 1806 represents the new order placed by the buyer selecting submenu option 910 in GUI view 1402. As shown, the entry 1806 indicates a new order status and an identification number for the order.

Overlay 1804 may also include options selectable by the user to perform actions on orders. The options displayed may be selected for display based on the statuses of the orders represented in overlay 1804. As an example, overlay 1804 includes an option 1808 associated with entry 1806 and that may be selected by the user to accept the new order. Option 1808 may be displayed at any suitable location within overlay 1804, such as next to (e.g., immediately below) information for the order with which option 1808 is associated.

FIG. 19 illustrates a GUI view 1902 of a tabular graphical user interface that may be displayed in response to a user selection of an entry in overlay 1804, such as entry 1806 representing the new order. As shown, GUI view 1902 may include information about the new order. The information, which may be displayed within cells of a table of cells in GUI view 1902, may include any information about the new order. In GUI view 1902, the order information includes reference identifiers for the products (column A), descriptions of the products (column B), and quantities ordered (column C).

Figure 20:
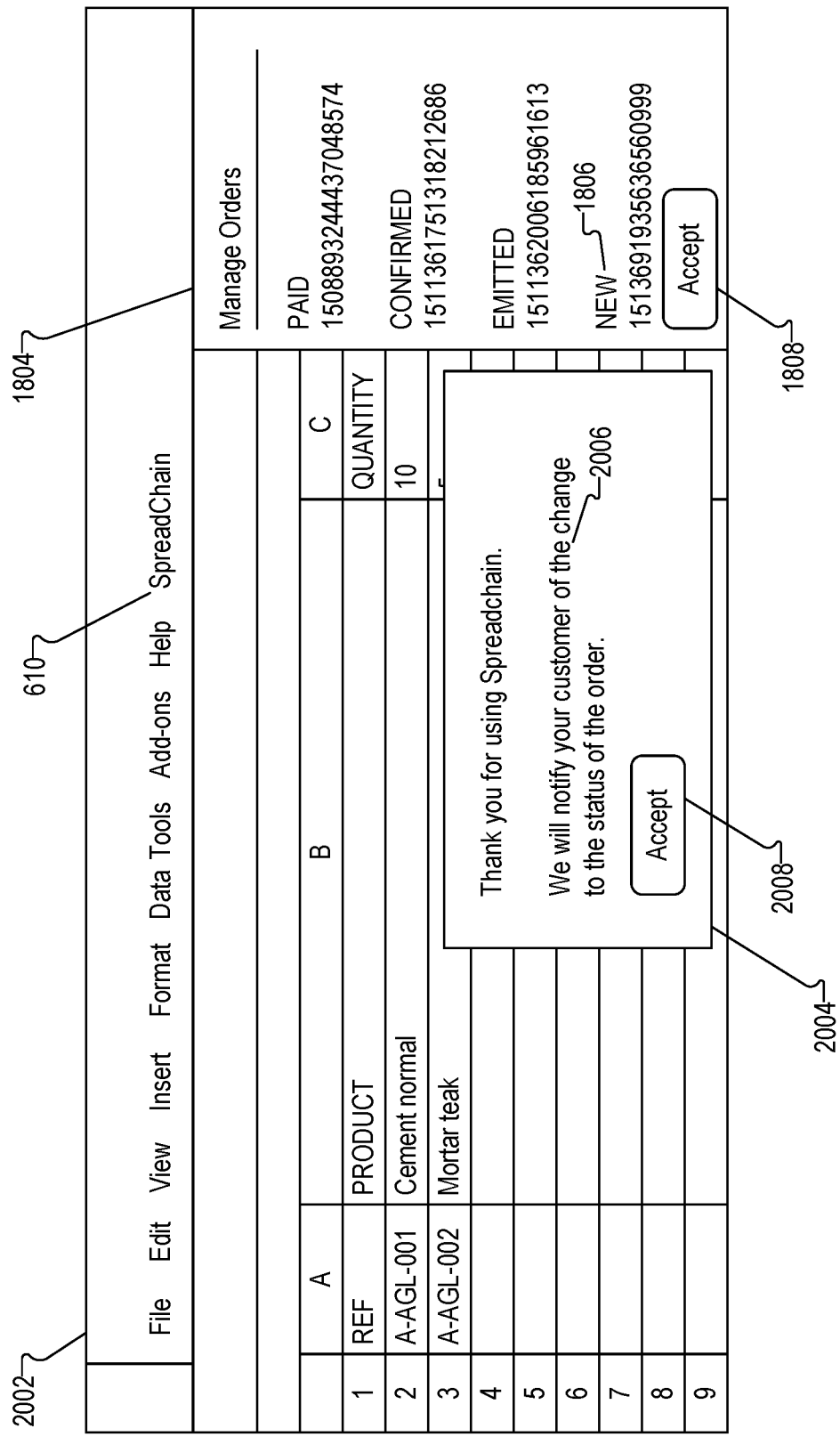

The user may provide input to select option 1808 to accept the order. FIG. 20 illustrates a GUI view 2002 of a tabular graphical user interface that may be displayed in response to acceptance of the order. As shown, GUI view 2002 may include an overlay 2004 including information 2006 indicating that the computing platform will notify the buyer of the change to the status of the order. Overlay 2004 may include an option 2008 configured to be selected by the user to dismiss overlay 2004.

In response to a user selection of option 1808 in GUI view 1902, interface system 106 (e.g., add-on component 304 and/or API 306) may receive the user input requesting to update the status of the order to accepted, translate the user input into a call, and issue the call to blockchain system 102, which may perform one or more operations to update the status of the order. For example, blockchain system 102 may update the status of the order from new to accepted, such as by executing a smart contract between the buyer and the supplier to update the status of the order in accordance with the terms of the smart contract and the user input received from the user. This may include adding data representative of the updated status of the order to a blockchain. When the data representative of the updated status of the order is added to the blockchain, the data becomes accessible to parties to the smart contract, which in this example includes the buyer and the supplier.

Figure 21:
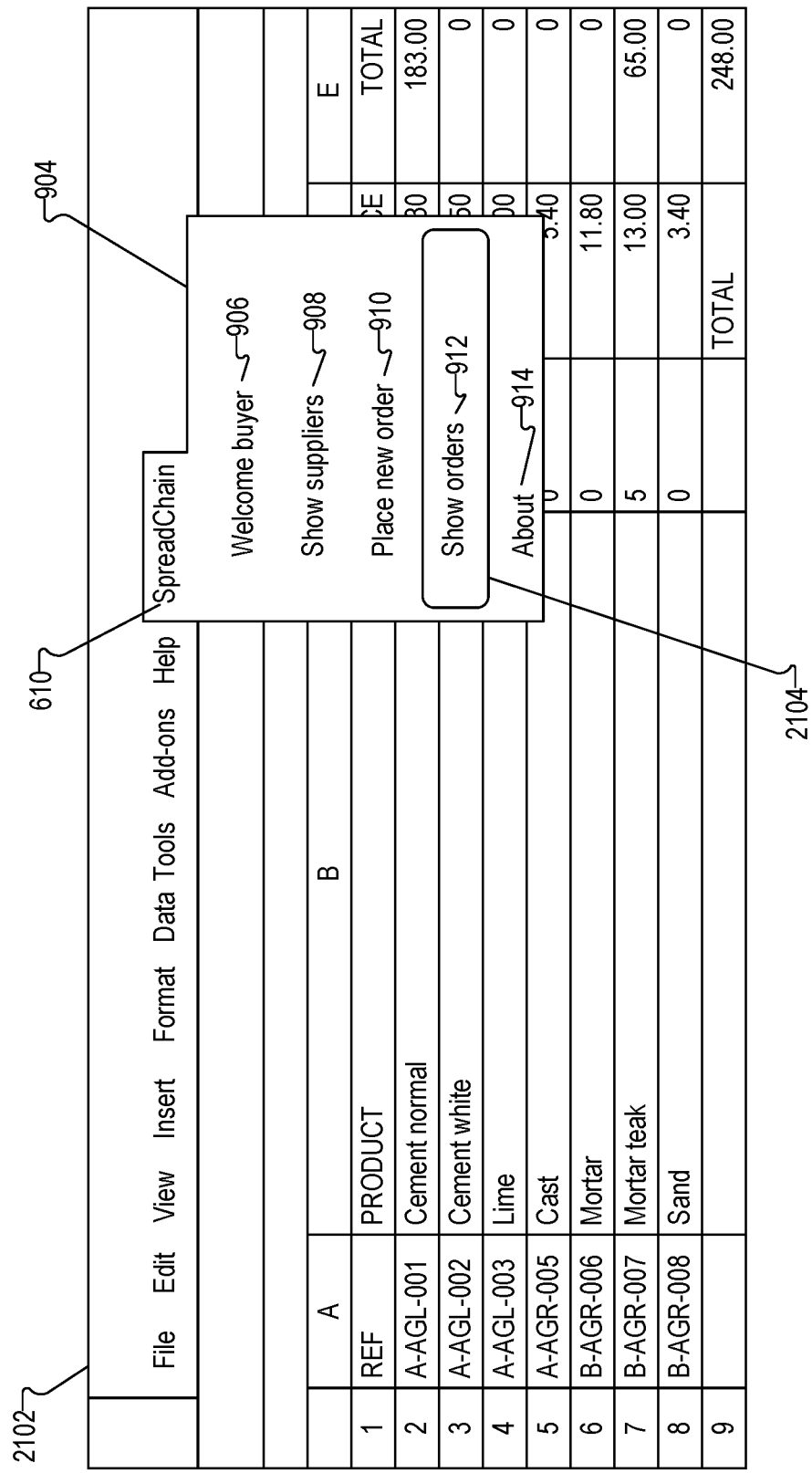

FIGS. 21-24 illustrate GUI views that may be presented to the buyer after the order has been accepted by the supplier. FIG. 21 illustrates a GUI view 2102 of a tabular graphical user interface that may be displayed during an active session of the buyer with blockchain system 102 and in response to a user selection of menu option 610. GUI view 2102 is the same as GUI view 1400 except that a submenu option selector 2104 is positioned on the option 912 to show orders rather than on the option 910 to place a new order.

FIG. 22 illustrates a GUI view 2202 of a tabular graphical user interface that may be displayed in response to a user selection of the submenu option 912 to show orders. As shown, GUI view 2202 may include an overlay 2204 in which information about orders is displayed. The order information displayed in the overlay 2204 may include information for orders that have been placed by the buyer.

The information about the orders may be accessed from the blockchain maintained by blockchain system 102. For example, in response to the user selection of the option 912 to show orders, user interface system 106 (e.g., add-on component 304 and/or API 306) may receive the user input requesting information about orders, translate the user input into a call, and issue the call to blockchain system 102, which may perform one or more operations to access and return the information about orders. For example, blockchain system 102 may retrieve orders associated with the buyer and provide data representative of the retrieved orders to interface system 106, which may provide the data representative of the orders to user interface application 104 for presentation to the user in GUI view 2202.

The order information in overlay 2204 may be arranged in a catalogue list of entries that are configured to be selected by the user to access more information about the orders. In response to a user selection of one of the entries, information about the order represented by the entry may be displayed. The information about orders may indicate statuses of the orders, including any of the exemplary order statuses described herein.

In overlay 2204 shown in GUI view 2202, a particular entry 2206 represents the new order placed by the buyer selecting submenu option 910 in GUI view 1402 and accepted by the supplier selection option 1808 in GUI view 1902. As shown, the entry 2206 indicates an accepted order status and an identification number for the order.

Overlay 2204 may also include options selectable by the user to perform actions on orders. The options displayed may be selected for display based on the statuses of the orders represented in overlay 2204. As an example, overlay 2204 includes an option 2208 associated with entry 2206 and that may be selected by the user to confirm receipt of the acceptance or to confirm receipt of the order (e.g., receipt of the products ordered by the buyer). Option 2208 may be displayed at any suitable location within overlay 2204, such as next to (e.g., immediately below) information for the order with which option 2208 is associated.

Figure 23:
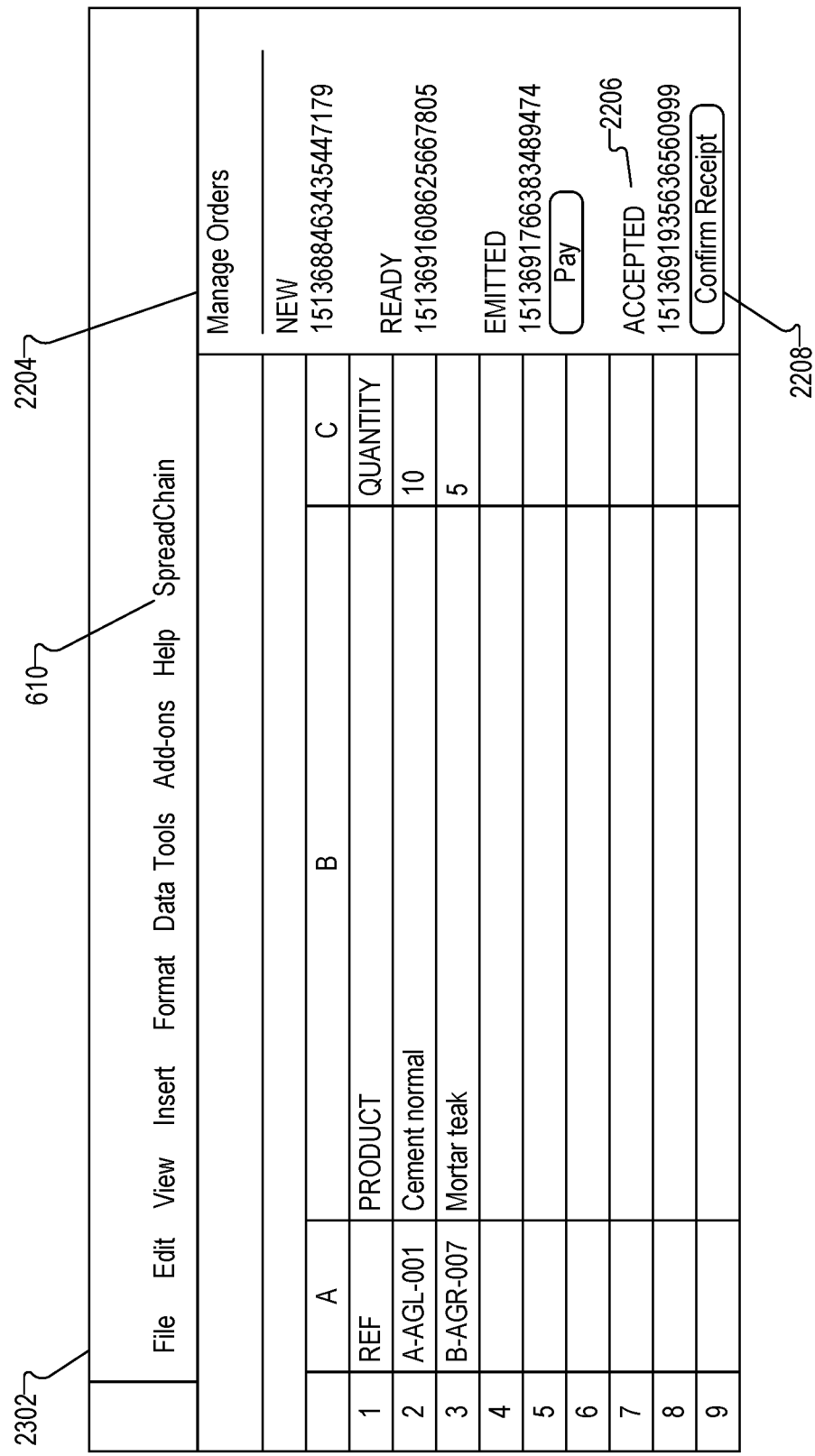

FIG. 23 illustrates a GUI view 2302 of a tabular graphical user interface that may be displayed in response to a user selection of an entry in overlay 2204, such as entry 2206 representing the accepted order. As shown, GUI view 2302 may include information about the accepted order. The information, which may be displayed within cells of a table of cells in GUI view 2302, may include any information about the accepted order. In GUI view 2302, the order information includes reference identifiers for the products (column A), descriptions of the products (column B), and quantities ordered (column C).

Figure 24:
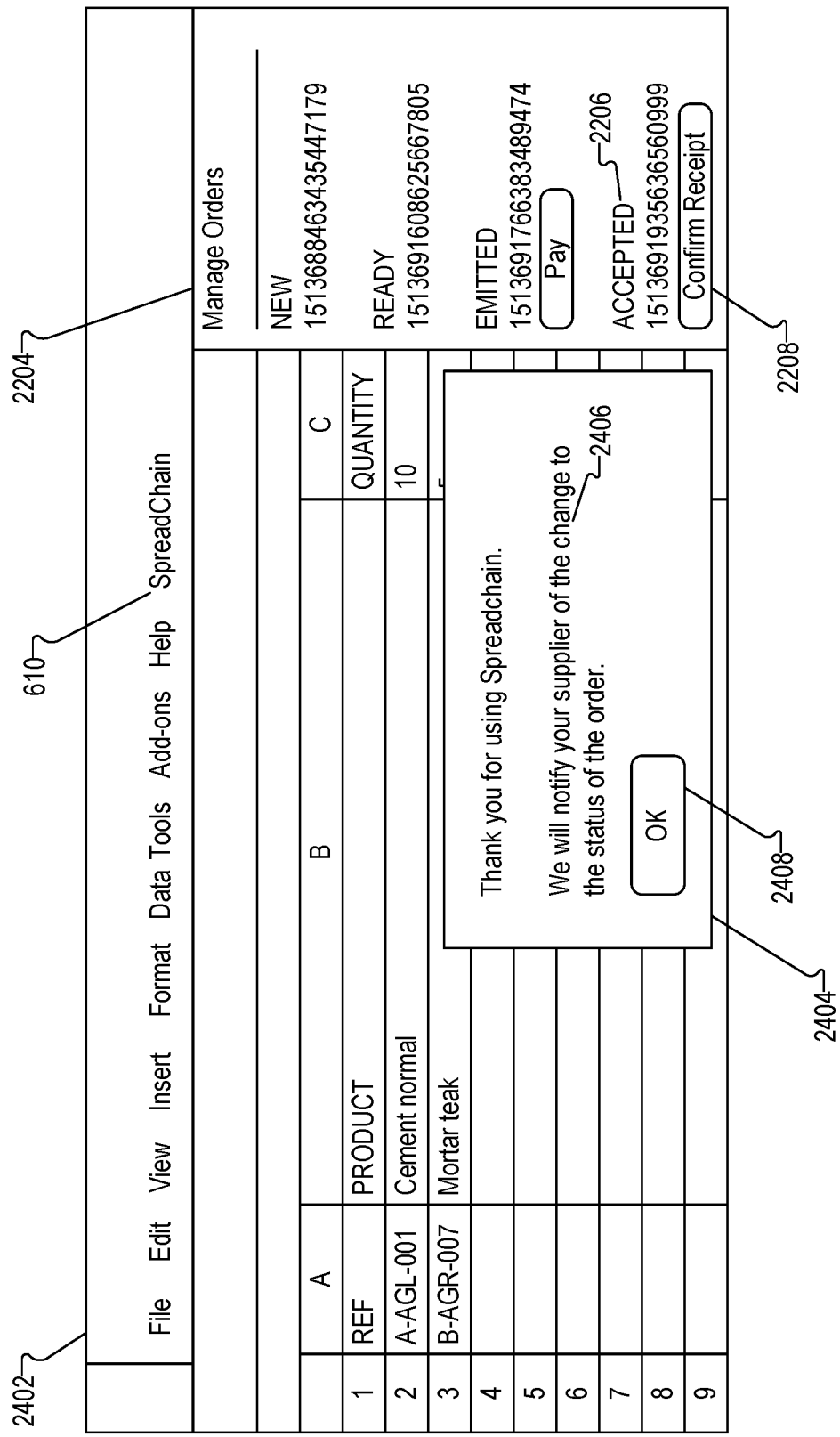

The user may provide input to select option 2208 to confirm receipt of the order. FIG. 24 illustrates a GUI view 2402 of a tabular graphical user interface that may be displayed in response to confirmation of receipt of the order. As shown, GUI view 2402 may include an overlay 2404 including information 2406 indicating that the computing platform will notify the supplier of the change to the status of the order. Overlay 2404 may include an option 2408 configured to be selected by the user to dismiss overlay 2404.

In response to a user selection of option 2208 in GUI view 2302, interface system 106 (e.g., add-on component 304 and/or API 306) may receive the user input requesting to update the status of the order to confirmed or ready, translate the user input into a call, and issue the call to blockchain system 102, which may perform one or more operations to update the status of the order. For example, blockchain system 102 may update the status of the order from accepted to confirmed or ready, such as by executing a smart contract between the buyer and the supplier to update the status of the order in accordance with the terms of the smart contract and the user input received from the user. This may include adding data representative of the updated status of the order to a blockchain. When the data representative of the updated status of the order is added to the blockchain, the data becomes accessible to parties to the smart contract, which in this example includes the buyer and the supplier.

Figure 25:
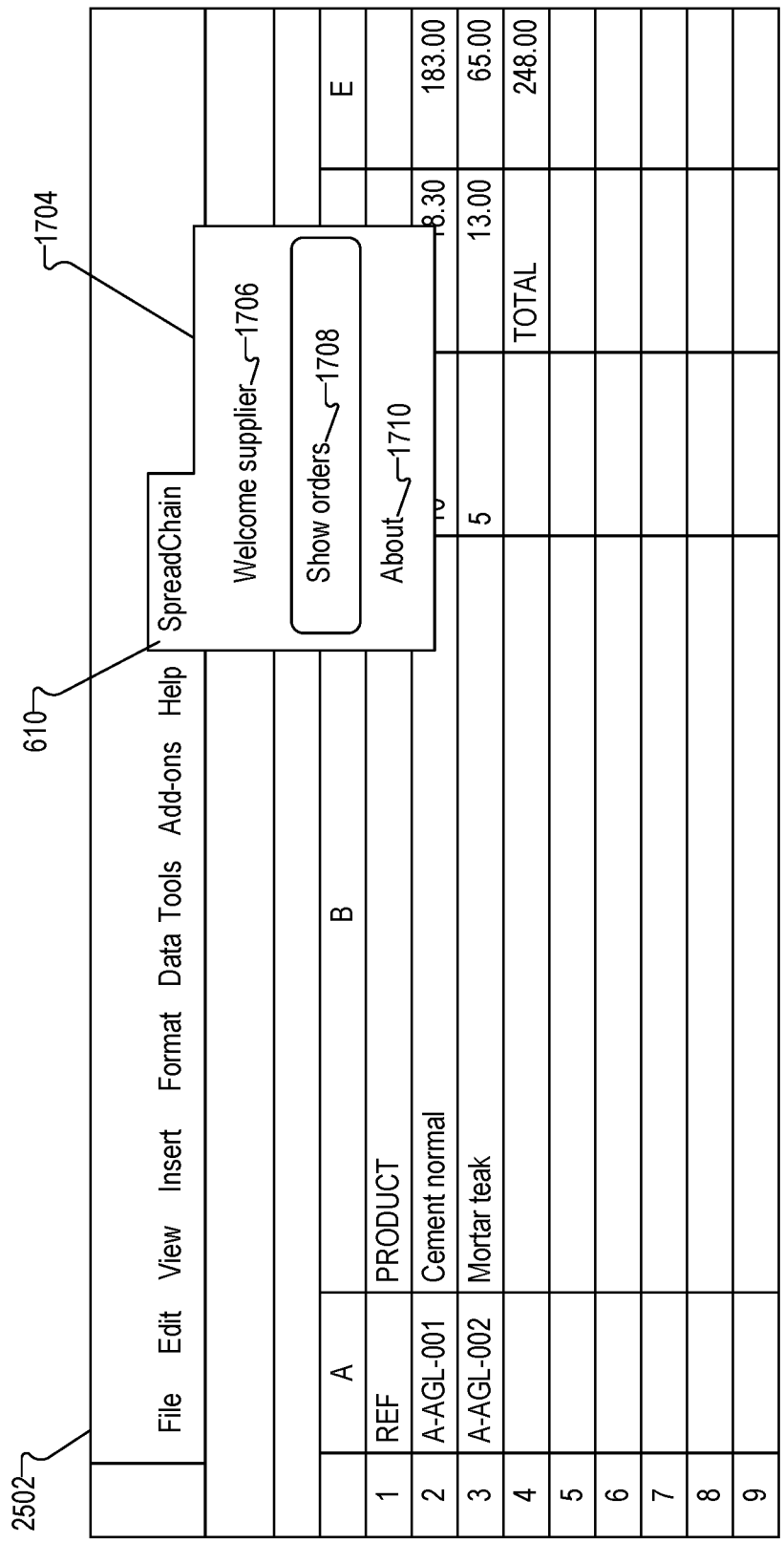
Figure 26:
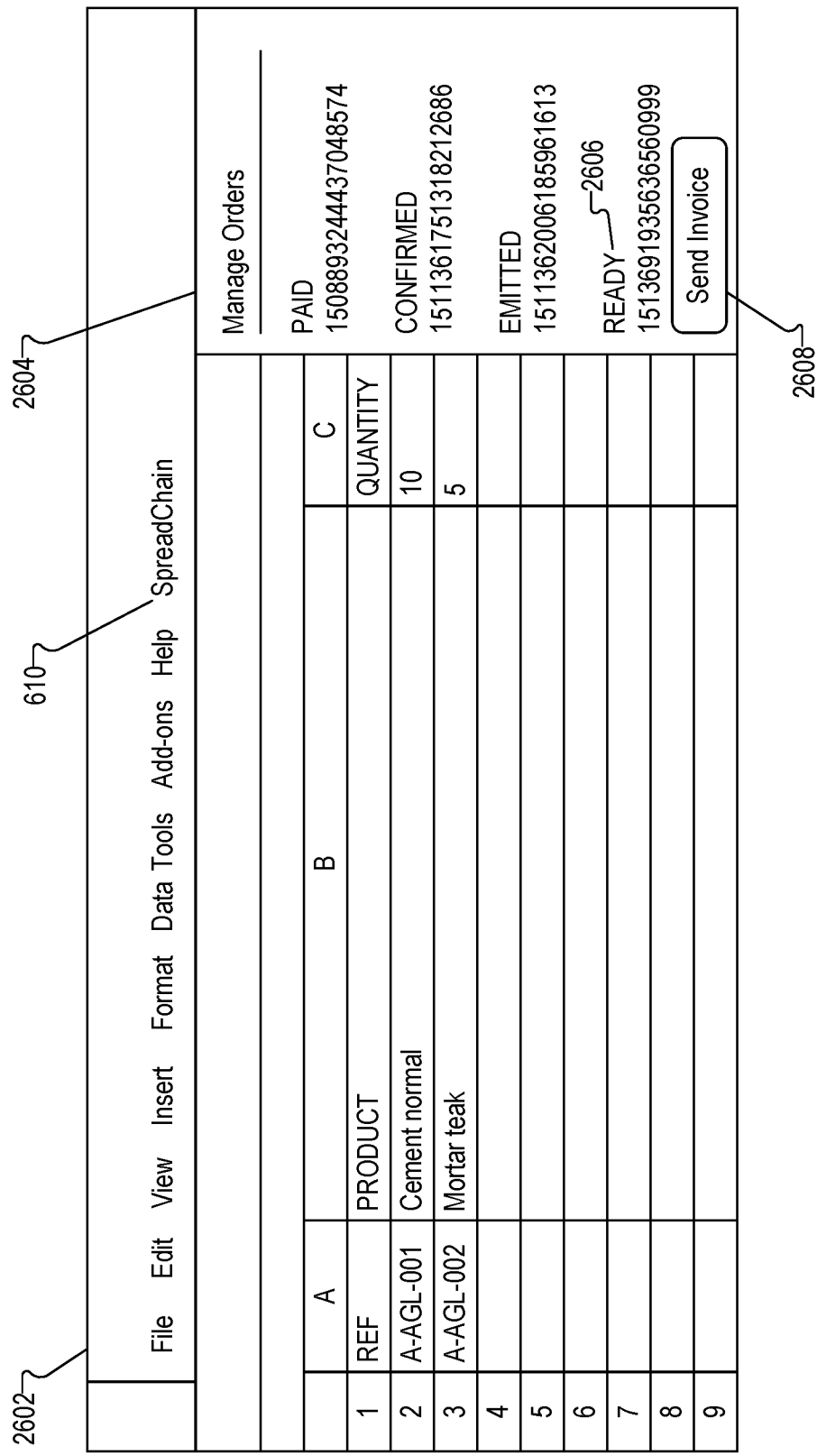
Figure 27:
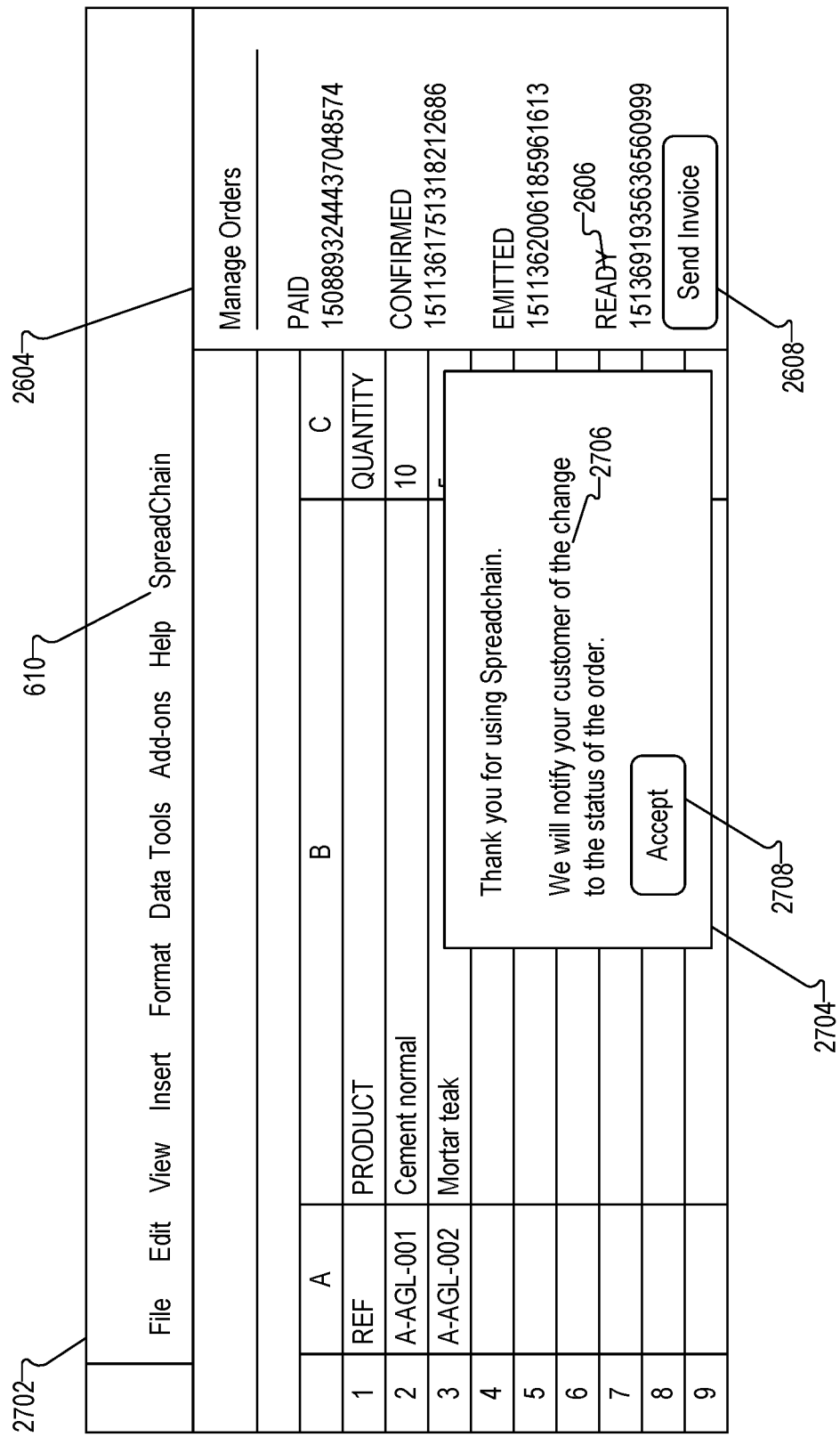

FIGS. 25-27 illustrate GUI views that may be presented to the supplier after receipt of the order has been confirmed by the buyer. FIG. 25 illustrates a GUI view 2502 of a tabular graphical user interface that may be displayed in response to the supplier selecting the "SpreadChain" menu option 610. GUI view 2502 the same as GUI view 1702 except that GUI view 2502 is presented to the supplier after the buyer has confirmed receipt of the order.

FIG. 26 illustrates a GUI view 2602 of a tabular graphical user interface that may be displayed in response to a user selection of the submenu option 1708 to show orders in GUI view 2502. As shown, GUI view 2602 may include an overlay 2604 in which information about orders is displayed. The order information displayed in the overlay 2604 may include information for orders that have been received by the supplier, such as described herein in reference to overlay 1804. As shown, GUI view 2602 may be the same as GUI view 1802 except that a status of an order has been updated from having a new status to having a ready status and an option associated with the order has been updated accordingly. Specifically, overlay 2604 includes an entry 2606 representing the order and indicating the identification number for the order and that the status of the order is ready. Overlay 2604 further includes an option 2608 selectable by the user to send an invoice to the buyer.

The information about the orders shown in GUI view 2602 may be accessed from the blockchain maintained by blockchain system 102. For example, in response to the user selection of the option 1708 to show orders, user interface system 106 (e.g., add-on component 304 and/or API 306) may receive the user input requesting information about orders, translate the user input into a call, and issue the call to blockchain system 102, which may perform one or more operations to access and return the information about orders. For example, blockchain system 102 may retrieve orders associated with the supplier and provide data representative of the retrieved orders to interface system 106, which may provide the data representative of the orders to user interface application 104 for presentation to the user in GUI view 2602.

FIG. 27 illustrates a GUI view 2702 of a tabular graphical user interface that may be displayed in response to user selection of option 2608 to send an invoice. As shown, GUI view 2702 may be similar to GUI view 2602 and may additionally include an overlay 2704 including information 2706 indicating that the computing platform will notify the buyer of the change to the status of the order. Overlay 2704 may include an option 2708 configured to be selected by the user to dismiss overlay 2704.

Figure 28:
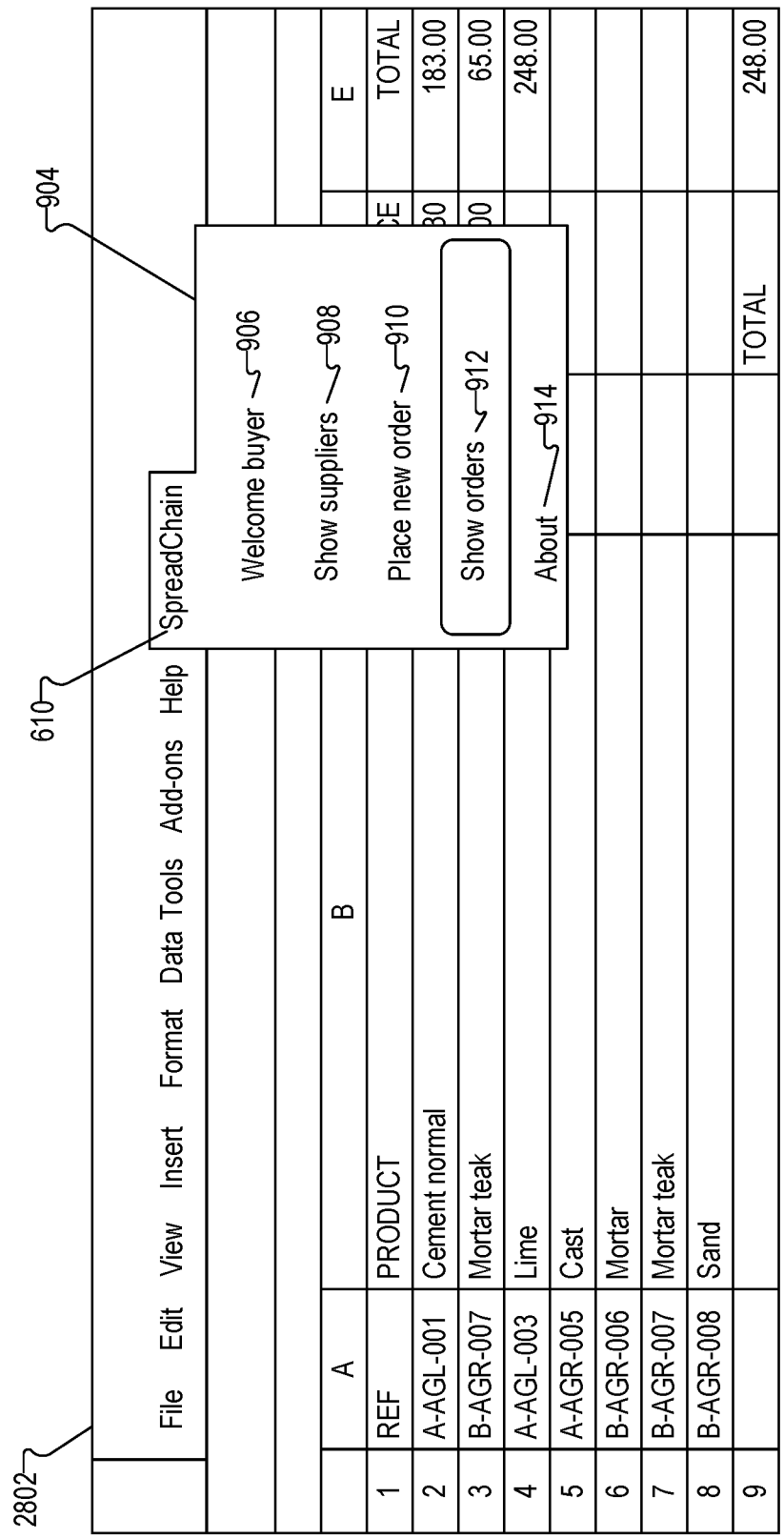
Figure 30:
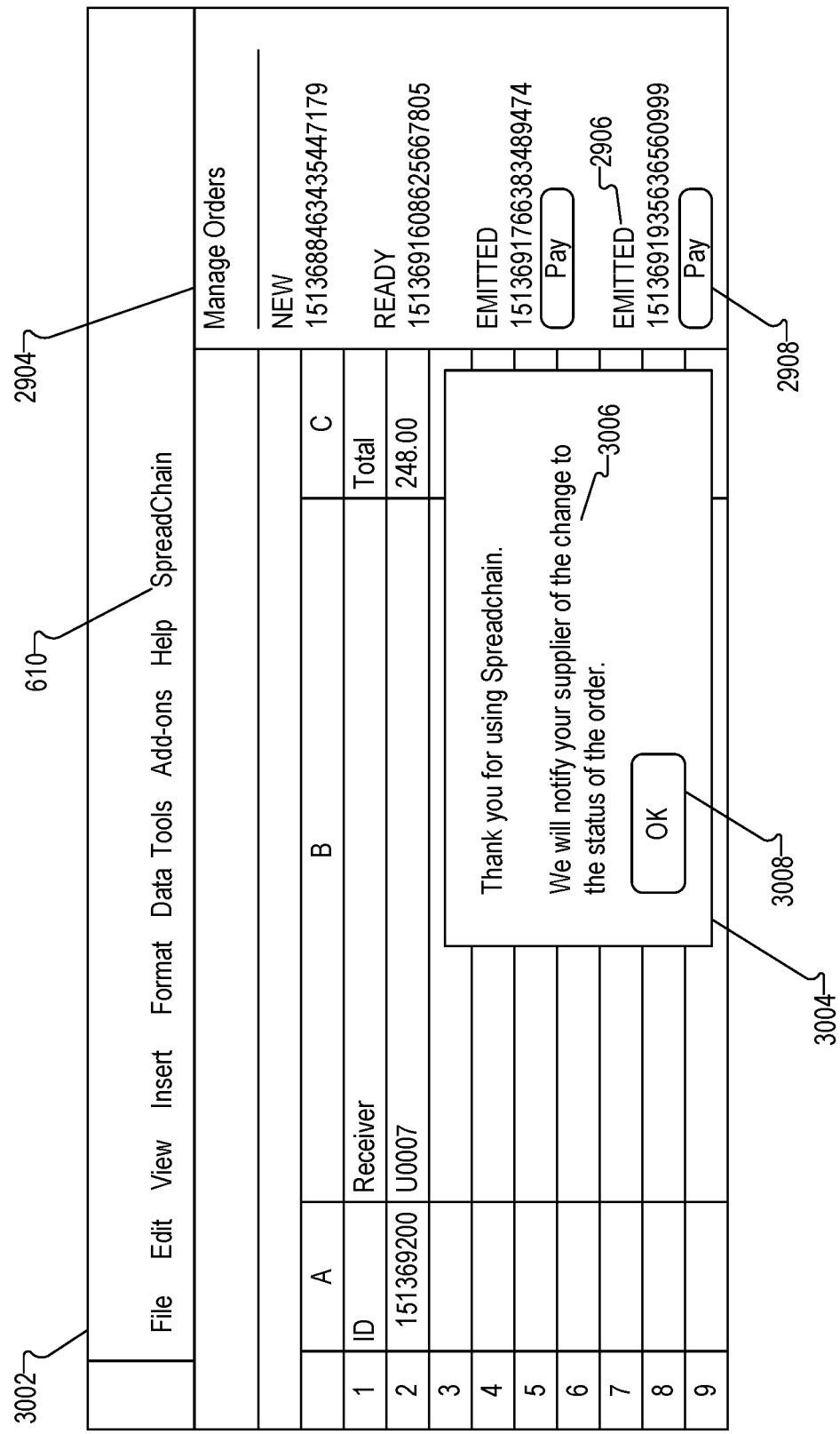

FIGS. 28-30 illustrate GUI views that may be presented to the buyer after the invoice has been issued by the supplier. FIG. 28 illustrates a GUI view 2802 of a tabular graphical user interface that may be displayed during an active session of the buyer with blockchain system 102 and in response to a user selection of menu option 610. GUI view 2802 is the same as GUI view 2102 except that GUI view 2802 is provided after the invoice has been issued by the supplier.

FIG. 29 illustrates a GUI view 2902 of a tabular graphical user interface that may be displayed in response to a user selection of the submenu option 912 to show orders in GUI view 2802. As shown, GUI view 2902 may include an overlay 2904 in which information about orders is displayed. The order information displayed in the overlay 2904 may include information for orders that have been placed by the buyer. As shown, GUI view 2902 may be the same as GUI view 2202 except that a status of an order has been updated from having an accepted status to having an emitted status and an option associated with the order has been updated accordingly. Specifically, overlay 2904 includes an entry 2906 representing the order and indicating the identification number for the order and that the status of the order is emitted, meaning that an invoice for the order has been issued by the supplier. Overlay 2904 further includes an option 2908 selectable by the user to pay the invoice.

FIG. 30 illustrates a GUI view 3002 of a tabular graphical user interface that may be displayed in response to user selection of option 2908 to pay the invoice in GUI view 2902. As shown, GUI view 3002 may include an overlay 3004 including information 3006 indicating that the computing platform will notify the supplier of the change to the status of the order. Overlay 3004 may include an option 3008 configured to be selected by the user to dismiss overlay 3004.

In response to a user selection of option 2908 in GUI view 2902, interface system 106 (e.g., add-on component 304 and/or API 306) may receive the user input requesting to update the status of the order to paid, translate the user input into a call, and issue the call to blockchain system 102, which may perform one or more operations to update the status of the order. For example, blockchain system 102 may update the status of the order from emitted to paid, such as by executing a smart contract between the buyer and the supplier to update the status of the order in accordance with the terms of the smart contract and the user input received from the user. This may include adding data representative of the updated status of the order to a blockchain. When the data representative of the updated status of the order is added to the blockchain, the data becomes accessible to parties to the smart contract, which in this example includes the buyer and the supplier.

Figure 31:
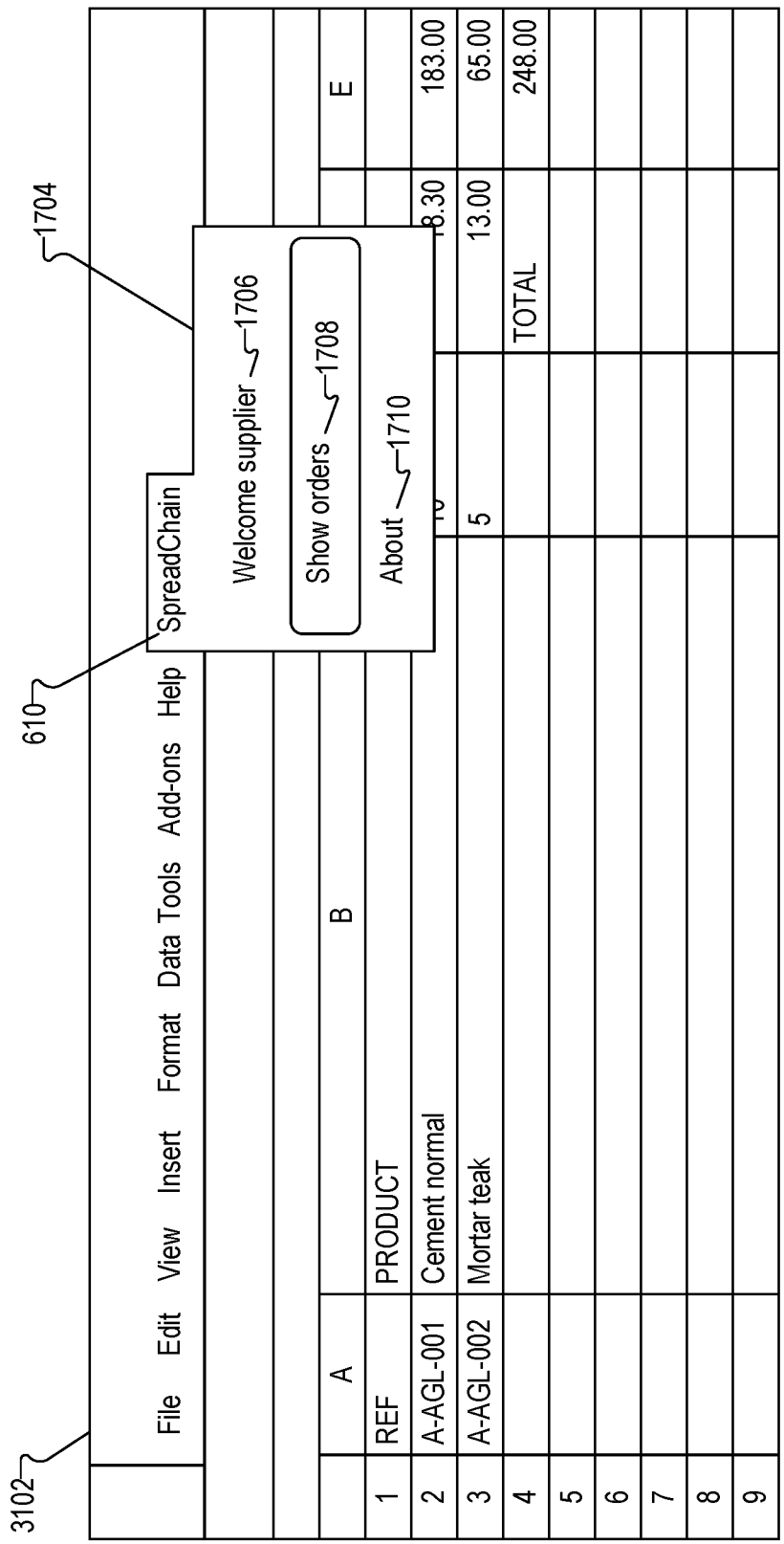

FIGS. 31-33 illustrate GUI views that may be presented to the supplier after the invoice has been paid by the buyer. FIG. 31 illustrates a GUI view 3102 of a tabular graphical user interface that may be displayed in response to the supplier selecting the "SpreadChain" menu option 610. GUI view 3102 the same as GUI view 2502 except that GUI view 3102 is presented to the supplier after the buyer has paid the invoice for the order.

FIG. 32 illustrates a GUI view 3202 of a tabular graphical user interface that may be displayed in response to a user selection of the submenu option 1708 to show orders in GUI view 3102. As shown, GUI view 3202 may include an overlay 3204 in which information about orders is displayed. The order information displayed in the overlay 3204 may include information for orders that have been received by the supplier, such as described herein in reference to overlay 1804. As shown, GUI view 3202 may be the same as GUI view 2602 except that a status of an order has been updated from having a ready status to having a paid status and an option associated with the order has been updated accordingly. Specifically, overlay 3204 includes an entry 3206 representing the order and indicating the identification number for the order and that the status of the order is paid. Overlay 3204 does not include an option selectable by the user to update the status of the order, which may be the case when the paid status is the final status of an order.

FIG. 33 illustrates a GUI view 3302 of a tabular graphical user interface that may be displayed in response to a user selection of entry 3206 in overlay 3204 in GUI view 3202. As shown, GUI view 3302 may include information about the paid invoice. The information, which may be displayed within cells of a table of cells in GUI view 3302, may include any information about the invoice. In GUI view 3302, the invoice information includes a reference identifier for the invoice (column A), receiver information for the invoice or order (column B), and a total amount for the invoice (column C).

The GUI views illustrated in FIGS. 6-33 represent examples of smart contract based exchanges via a blockchain, from a perspective of interactive GUI views presented to parties to a smart contract through an exemplary life cycle of an order. The GUI views are exemplary only. Other suitable GUI views may be provided in other examples to facilitate user interaction with blockchain system 102 to facilitate smart contract based exchanges via a blockchain.

While certain examples described herein are directed to smart contracts between parties that involve purchase of products from a supplier, this is illustrative only. Smart contracts may be defined to perform any actions on a blockchain to represent exchanges between parties to the smart contracts, including actions automatically initiated and performed by smart contracts in response to defined conditions being satisfied.

Another example of creating and using a smart contract to perform actions on a blockchain to represent exchanges between parties will now be described. In this example, the exchanges between the parties may include exchanges associated with negotiating, establishing, and executing a smart contract. The execution of the smart contract may further include the smart contract executing an action based on an occurrence of a defined event.

Figure 34:
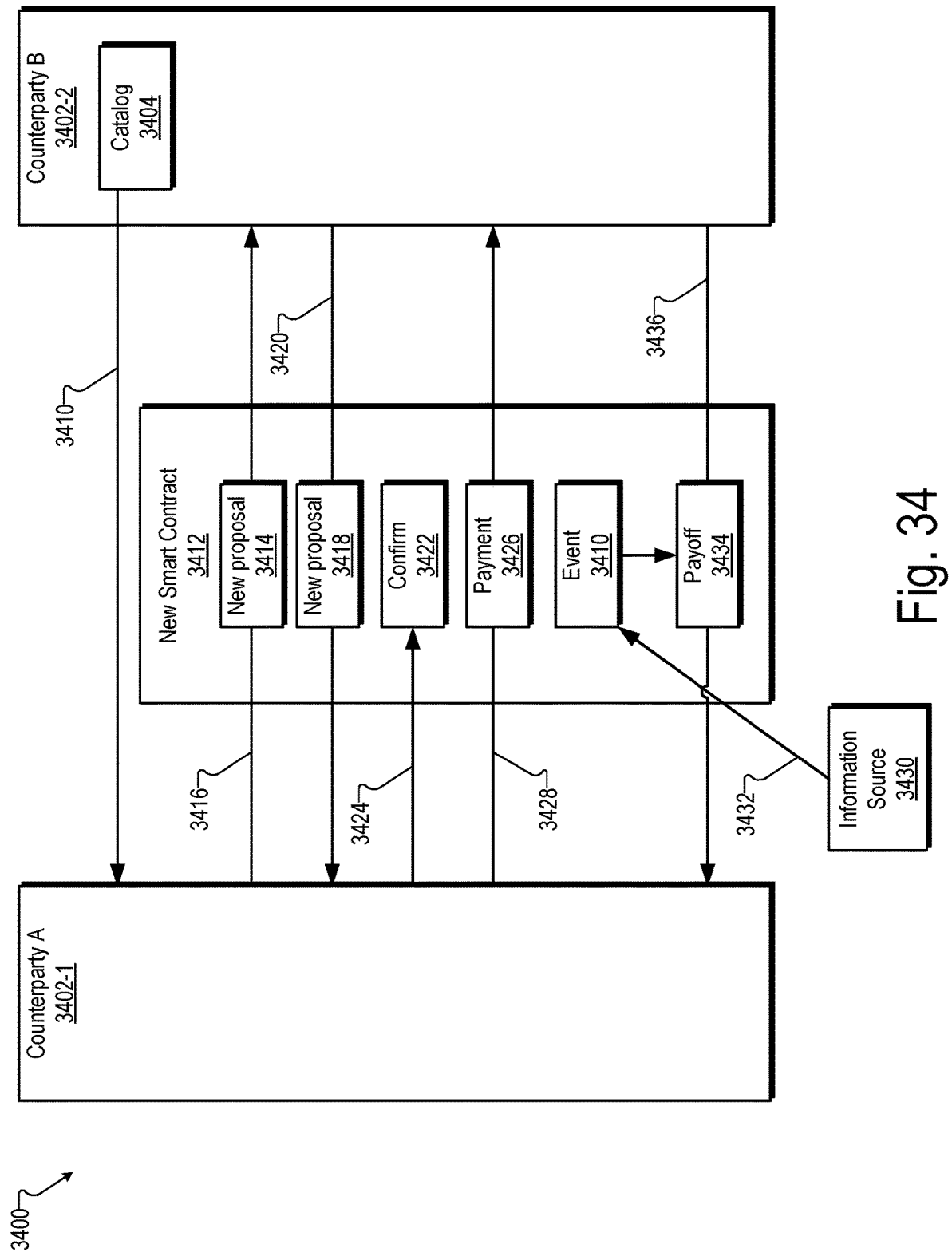
FIG. 34 illustrates an exemplary operation flow according to principles described herein.

FIG. 34 illustrates an exemplary operation flow 3400 in which parties labeled counterparty A 3402-1 and counterparty B 3402-2 negotiate, establish, and execute a smart contract by way of exchanges on a blockchain. The exchanges may be performed by blockchain system 102 and interface system 106 in some implementations.

Counterparty B 3402-2 may be registered with blockchain system 102 and may provide a catalogue 3404 of products for access by way of blockchain system 102. The products may include any suitable products, such as over-the-counter (OTC) traded products like OTC commodities or financial instruments. Counterparty A 3402-1 may be registered with blockchain system 102 and may request catalogue 3404, which may be provided to counterparty A 3402-1 in operation 3410.

Counterparty A 3402-1 and counterparty B 3402-2 may negotiate terms of a new smart contract 3412 by way of exchanges represented on a blockchain generated and maintained by blockchain system 102. For example, counterparty A 3402-1 may view the catalogue 3404 of products and propose to purchase a product listed in the catalogue 3404. A new proposal 3414 may be sent from counterparty A 3402-1 to counterparty B 3402-2 in operation 3416. Counterparty B 3402-2 may view the new proposal 3414 and offer a new proposal 3418, which may be sent from counterparty B 3402-2 to counterparty A 3402-1 in operation 3420. Counterparty A 3402-1 may view and confirm acceptance of the new proposal 3418. A confirmation 3422 is sent from counterparty A 3402-1 to the new smart contract 3412 in operation 3424. The confirmation 3422 of the new proposal 3418 indicates that both parties agree to the proposed terms of the new smart contract 3412, and the new smart contract 3412 is established (e.g., by blockchain system 102) in accordance with the agreed upon terms. Counterparty A 3402-1 then emits a payment 3426 to counterparty B 3402-2 in operation 3428, such as a payment for consideration in accordance with the terms of the new smart contract 3412.

The terms of the new smart contract 3412 may define an event that will trigger execution of one or more actions by the new smart contract 3412. To this end, the terms of the new smart contract 3412 may specify an information source 3430 from which information is accessed to determine whether the defined event occurs. The information source 3430 may be any suitable source of information, such as a computing system that provides the information (e.g., a third-party computing system in a domain that is separate from the domain of blockchain system 102). The new smart contract 3412 may access information from information source 3430 in operation 3432.

Based on the accessed information, the new smart contract 3412 may determine that the defined event has occurred and may execute one or more actions in response to the occurrence of the defined event. For example, the new smart contract 3412 may automatically initiate a payoff 3434 that is sent from counterparty B 3402-2 to counterparty A 3402-1 in operation 3436 in accordance with the terms of the new smart contract 3412.

In certain examples, the product may be an OTC traded financial instrument (e.g., an OTC stock), and the new smart contract 3412 may represent a call or put option agreed to by counterparty A 3402-1 and counterparty B 3402-2 in relation to the underlying financial instrument. In such examples, the defined event may be an expiration date and/or an expiration price that triggers an OTC payoff.

An example of a tabular graphical user interface that may be provided by user interface application 102 and interface system 106 (e.g., by spreadsheet application 302 and add-on component 304 of interface system 106) will now be described with reference to FIGS. 35-38, which illustrate exemplary graphical user interface (GUI) views according to principles described herein. A computing platform formed by interface system 106 and blockchain system 102 may be configured to receive data representative of user inputs that are received by way of the tabular GUI, including any of the exemplary user inputs described with reference to FIGS. 35-38, translate the user inputs into calls to blockchain system 102, and issue the calls to blockchain system 102, which may perform one or more actions corresponding to the calls to facilitate smart contract based exchanges via a blockchain.

FIG. 35 illustrates a GUI view 3502 of a tabular graphical user interface. As shown, GUI view 3502 may include a table 3504 formed by columns (e.g., columns A-C) and rows (e.g., rows 1-11). The table 3504 includes a grid of cells forms by the columns and rows. Data, such as alphanumeric characters, equations, etc., may be entered and stored in the cells of the table 3504. The table 3504 may be part of an interactive spreadsheet application in certain examples.

GUI view 3502 may further include a menu header section 3506 that includes a menu 3508 of options for interacting with the interactive GUI. As shown, the menu 3508 of options includes a menu option 3510 titled "SpreadChain," which menu option 3510 is configured to be selected by a user to access operations of a computing platform formed by interface system 106 and blockchain system 102. In certain examples, the "SpreadChain" menu option 3510 may be integrated into GUI view 3502 by add-on component 304 and may be referred to as an add-on menu option.

A submenu may be displayed when the "SpreadChain" menu option 3510 is selected. The submenu may include one or more submenu options configured to be selected by a user to access operations of the computing platform formed by interface system 106 and blockchain system 102. For example, the submenu may include submenu options such as a submenu option to access information about available products (e.g., to access a marketplace of available products), a submenu option to access orders (e.g., a list of transactions), and a submenu option to access a history of orders and associated exchanges (e.g., a history of transactions). In response to a user selection of the submenu option to access available products, an overlay pane 3512 containing information about products may be displayed as shown in FIG. 35. In the illustrated example, the catalogue includes a call option and a put option offered by a counterparty.

A user may provide input to select the call option or the put option in order to create a proposal to purchase the call option or the put option. In response to a user selection of the put option, for example, GUI view 3502 may display information and tools for use by the user to define a proposal to purchase the put option. As shown in FIG. 35, GUI view 3502 includes put option proposal fields in column A. The user may interact with cells in column B to specify values for the fields. For example, in cell B3 the user may access a drop-down menu to select to propose to buy or sell a call option, in cell B4 the user may access a drop-down menu to select an underlying asset (e.g., a stock), in cell B5 the user may input a notional amount, in cell B6 the user may input a strike amount, in cell B7 the user may enter an expiration date, and in cell B8 the user may input a premium amount. In the illustrated example, the user has selected to buy a put option for as asset named ABC and has input a notional amount of 100, a strike amount of 10.00, an expiration date of Apr. 3, 2019, and a premium amount of 9.50. The user may select a request for quote (RFQ) button 3514 to submit the proposed put option to the counterparty offering the put option.

FIG. 36 illustrates a GUI view 3602 that may be presented to the counterparty offering the put option, i.e., the seller, after the potential buyer has submitted the proposed put option to blockchain system 102 and blockchain system 102 has recorded the proposal on a blockchain such that the proposal is accessible by the seller. The seller may request to access orders and may be presented with a list of notifications that are awaiting action by the seller. The list may include the newly submitted proposal for the put option.

As shown, GUI view 3602 may include an overlay pane 3604 that includes a list of notifications for the seller, and the list includes a notification 3606 for the proposed put option. The notification indicates the name of the underlying asset for the proposed put option and a status for the proposal, which status is "requested" in this example. The overlay pane 3604 further includes a user selectable option 3608 to view details of the proposal and a user selectable option 3610 to view all proposals from the buyer.

In response to a user selection of option 3608, information about the proposal may be displayed in GUI view 3602. As shown, the information may be presented in a tabular area of GUI view 3602 and may indicate information such as an order identifier for the proposal, a buyer name, a seller name, a status of the order (requested), and a date and time of the most recent update to the order. The information may further indicate a proposal type (put option), that the proposal is to buy the put option, an underlying asset name, a notional amount, a strike amount, an expiration date, and a premium amount for the current proposal, as shown in column B of GUI view 3602. Column C of GUI view 3602 may include the same information that may be edited by the seller to create a new proposal. The seller may selection a confirm option 3612 to accept the current proposal or a new proposal option 3614 to submit a new proposal to the buyer. In response to a user selection of the confirm option 3612, the status of the order may be updated from "requested" to "confirmed" on the blockchain.

After the order has been confirmed by the seller, the buyer may access updated information about the order, such as by selecting a submenu option to view notifications waiting for action by the buyer. Information about the order may be presented to the buyer, and the information may indicate that the status of the order has been updated to "confirmed." The buyer may select an option to pay for the confirmed put option. In response, the status of the order is updated to "paid" to reflect that the buyer has paid the premium for the put option.

A defined event may occur, such as the buyer exercising the put option to sell the asset at the strike amount or the expiration date being reached without the buyer exercising the option. The smart contract may detect the event and, in response, perform an automatic payoff based on the terms of the put option and update the status of the order to "closed." After this occurs, the buyer may access information about the order, which information may show that the order is closed and may show details about the entire history of the transaction, including negotiation (e.g., proposal) history, payment history, event history, and payoff history. Such information may be presented in a tabular GUI view.

FIG. 37 illustrates a GUI view 3702 that may be presented to the buyer and which includes information about the closed order for the put option. FIG. 38 illustrates a GUI view 3802 that may be presented to the buyer and which includes historical information for the closed order for the put option, including information about the proposal, the payment, the event, and the payoff for the put option. GUI views 3702 and 3802 may be combined into a single GUI view in some examples.

Historical information associated with a financial transaction, such as the historical information shown in GUI view 3802 for the exemplary put option transaction, may be readily accessible from blockchain system 102 by way of interface facility 106 because transactional operations are recorded on a blockchain. The historical information may represent a trading information flow that may be used for regulatory purposes, such as to satisfy regulatory requirements of certain governmental organizations (e.g., by providing deal reconstruction information within an allowed regulatory timeframe).

Figure 39:
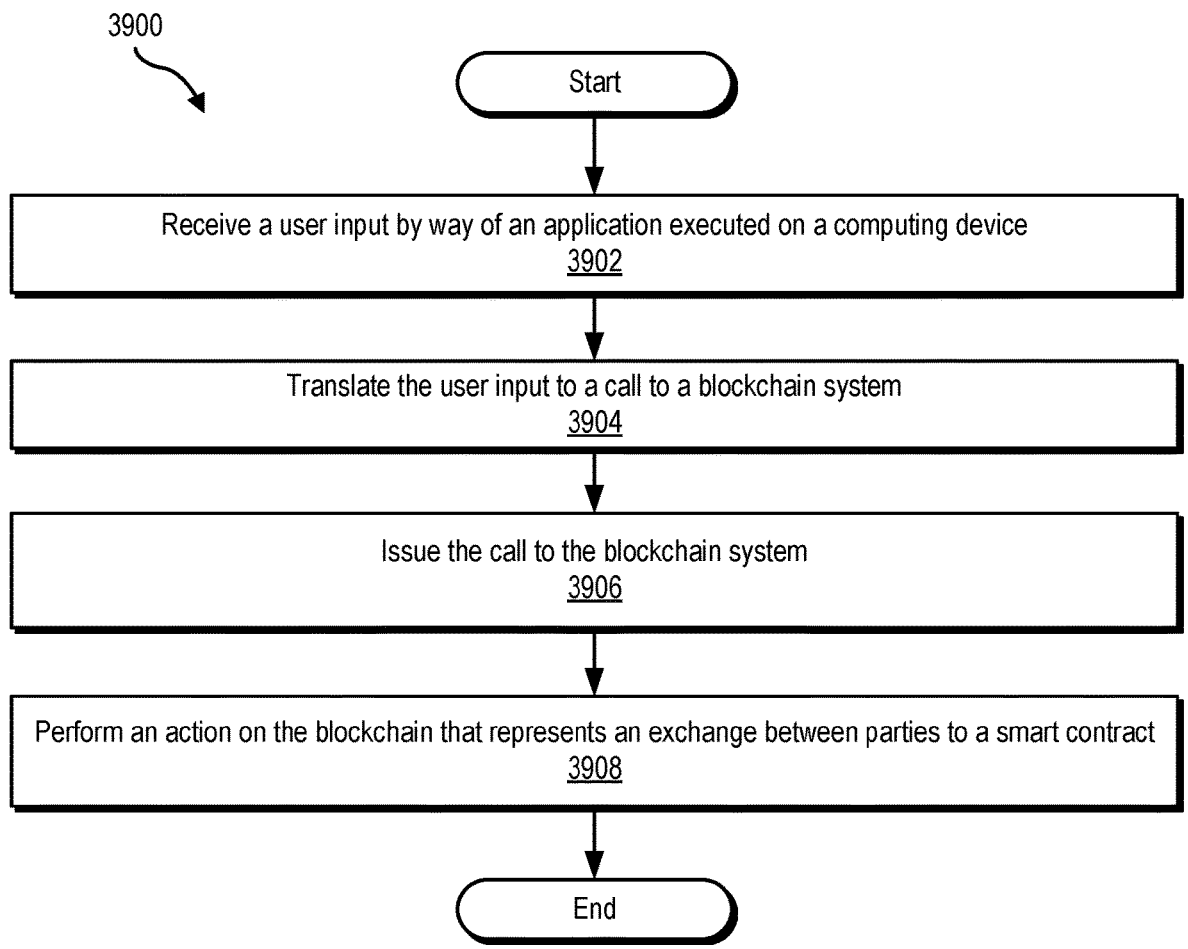
FIGS. 39-40 illustrate exemplary methods according to principles described herein.

FIG. 39 illustrates an exemplary method 3900. While FIG. 39 illustrates exemplary operations according to one embodiment, other embodiments may omit, add to, reorder, and/or modify any of the operations shown in FIG. 39. One or more of the operations shown in FIG. 39 may be performed by a computer-implemented system, such as a computing system implementing one or more elements of configuration 100 or configuration 300 and/or any implementation thereof.

In operation 3902, a computing system receives a user input by way of an application executed on a computing device. For example, the computing system may receive user input that is received by way of user interface application 104 or spreadsheet application 302. Operation 3902 may be performed in any of the ways described herein.

In operation 3904, the computing system translates the user input to a call to a blockchain system. For example, interface system 106 (e.g., add-on component 304 and/or API 306) may translate the user input to a call to blockchain system 102. Operation 3904 may be performed in any of the ways described herein.

In operation 3906, the computing system issues the call to the blockchain system. For example, interface system 106 (e.g., add-on component 304 and/or API 306) may issue the call to blockchain system 102. Operation 3906 may be performed in any of the ways described herein.

In operation 3908, the computing system performs an action on a blockchain that represents an exchange between parties to a smart contract. For example, blockchain system 102 may perform the action, based on the call and on the smart contract maintained by blockchain system 102, on the blockchain to represent the exchange between the parties. Operation 3908 may be performed in any of the ways described herein. As described herein, the action on the blockchain may make data representative of the exchange accessible to the parties to the smart contract.

Figure 40:
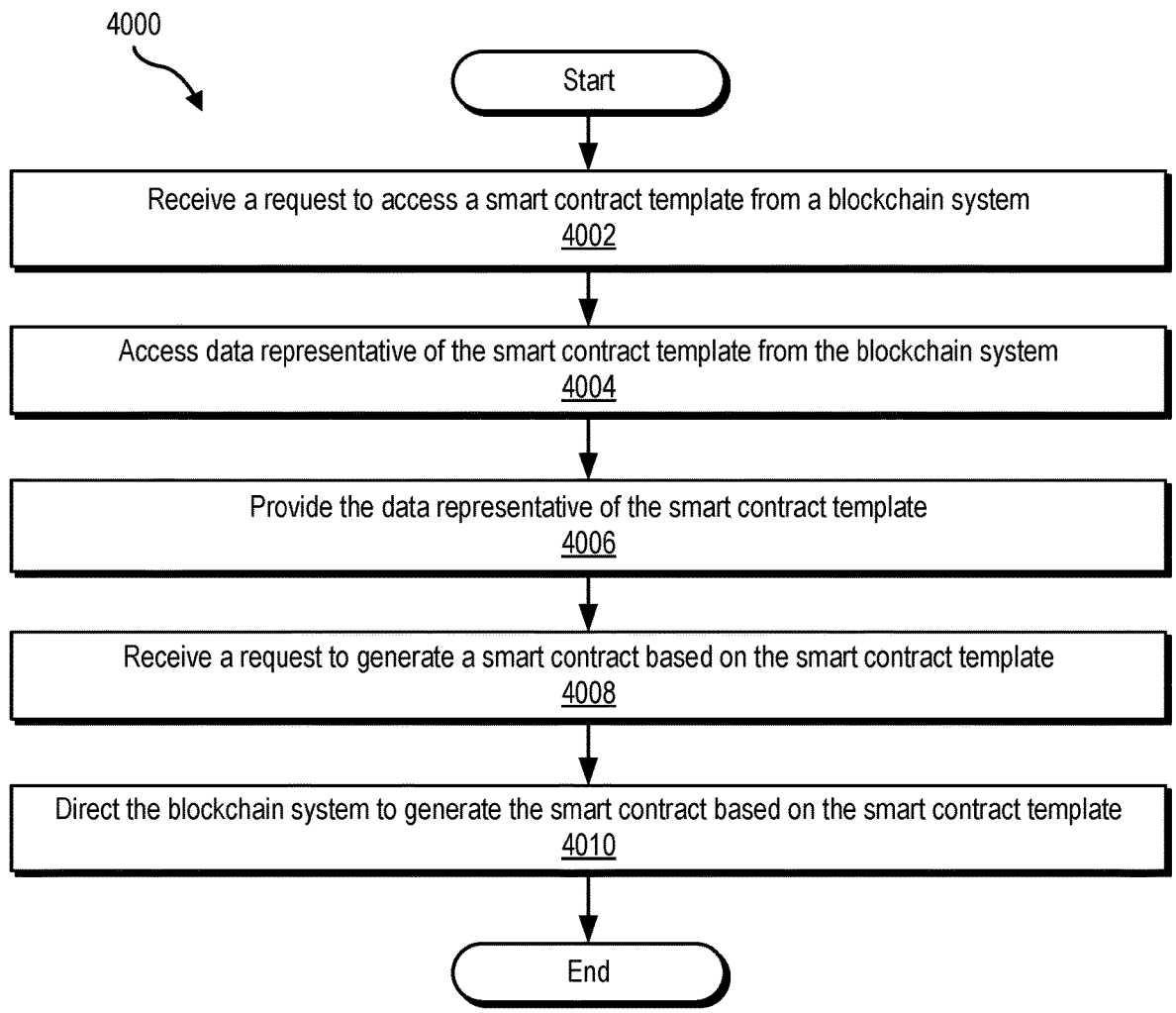

FIG. 40 illustrates an exemplary method 4000. While FIG. 40 illustrates exemplary operations according to one embodiment, other embodiments may omit, add to, reorder, and/or modify any of the operations shown in FIG. 40. One or more of the operations shown in FIG. 40 may be performed by a computer-implemented system, such as a computing system implementing one or more elements of configuration 100 or configuration 300 and/or any implementation thereof.

In operation 4002, a computing system receives a request to access a smart contract template from a blockchain system. For example, interface system 106 may receive the request from user interface application 104, and the request may be for a smart contract template maintained by blockchain system 102. Operation 4002 may be performed in any of the ways described herein.

In operation 4004, the computing system accesses data representative of the smart contract template from the blockchain system. For example, interface system 106 may translate the request to a call and issue the call to blockchain system 102 to request the smart contract template. Blockchain system 102 may retrieve and provide data representative of the smart contract template to interface system 106, which may receive the data representative of the smart contract template. Operation 4004 may be performed in any of the ways described herein.

In operation 4006, the computing system provides the data representative of the smart contract template. For example, interface system 106 may provide the data representative of the smart contract template to user interface application in response to the request to access the smart contract template. Operation 4006 may be performed in any of the ways described herein.

In operation 4008, a computing system receives a request to generate a smart contract based on the smart contract template. For example, interface system 106 may receive, from user interface application 104, a request for blockchain system 102 to generate a smart contract based on the smart contract template. The request may include terms for the smart contract as agreed to by parties to the smart contract. Operation 4008 may be performed in any of the ways described herein.

In operation 4010, the computing system directs the blockchain system to generate the smart contract based on the smart contract template and the terms agreed to by the parties to the smart contract. For example, interface system 106 may translate the request to a call and issue the call to blockchain system 102 to request generation of the smart contract based on the smart contract template and the agreed upon terms. Blockchain system 102 may generate the smart contract based on the smart contract template and the agreed upon terms in any suitable way. Operation 4010 may be performed in any of the ways described herein.

Any of the elements of configuration 100 or configuration 300 may include or be implemented by at least one physical computing device and may perform the various operations described herein by directing one or more components of the physical computing device to perform the operations. Accordingly, operations described herein may be performed, in certain implementations, one or more elements described herein directing one or more components of at least one physical computing device to perform the operations. Such operations may be referred to as being performed by a physical computing device, a computing system, and/or a computer-implemented system.

Figure 41:
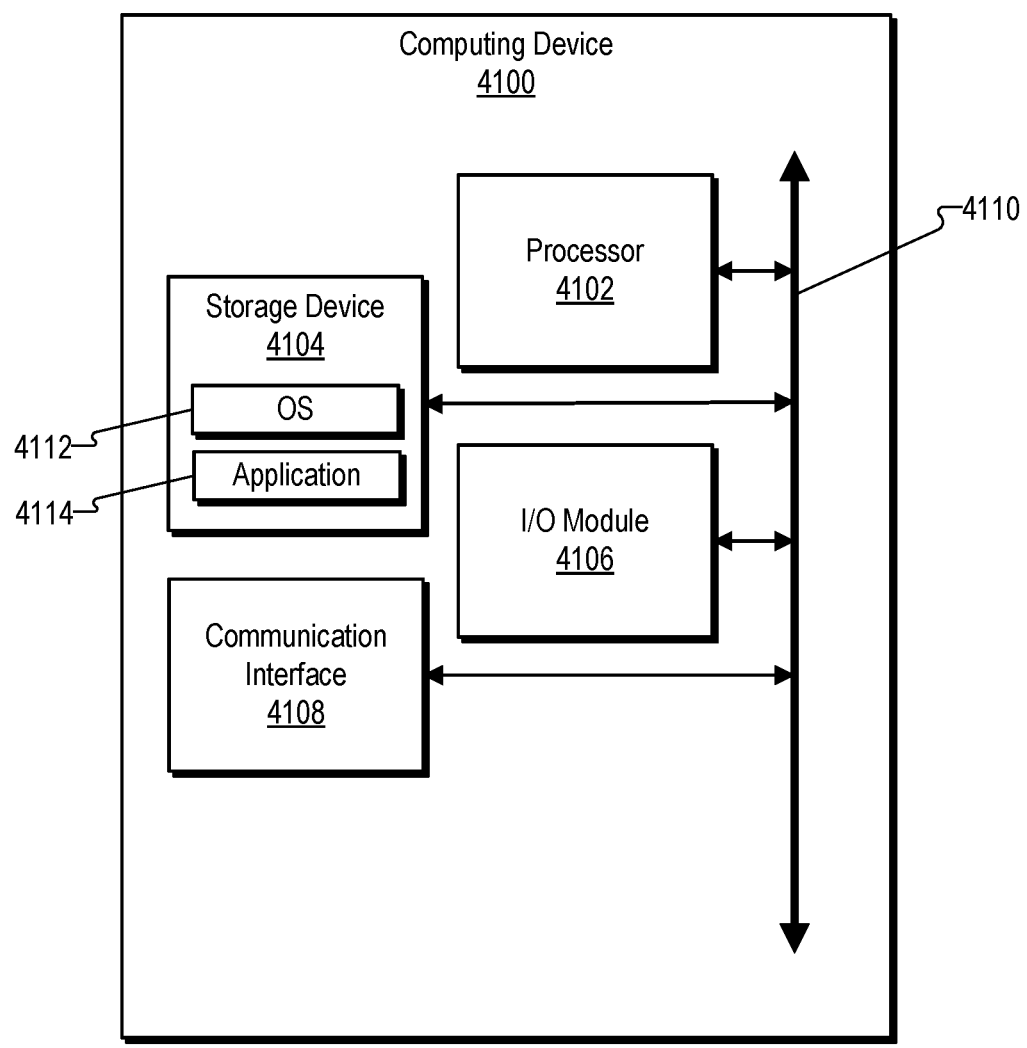
FIG. 41 illustrates an exemplary computing device according to principles described herein.

FIG. 41 illustrates an exemplary physical computing device 4100 ("computing device 4100") specifically configured to perform one or more of the operations described herein. As shown in FIG. 41, computing device 4100 may include a processor 4102, a storage device 4104, an input/output ("I/O") module 4106, and a communication interface 4108 communicatively connected to one another via a communication infrastructure 4110. While an exemplary computing device 4100 is shown in FIG. 41, the components illustrated in FIG. 41 are not intended to be limiting. Additional or alternative components may be used in other embodiments.

Processor 4102 generally represents any type or form of physical processing unit capable of processing data or interpreting, executing, and/or directing execution of one or more of the instructions, processes, and/or operations described herein. Processor 4102 may direct execution of operations in accordance with an operating system ("OS") 4112 and one or more applications, such as an application 4114, or other computer-executable instructions stored in storage device 4104 or another computer-readable medium.

Storage device 4104 may include one or more data storage media (e.g., a non-transitory computer-readable medium), devices, or configurations and may employ any type, form, and combination of data storage media and/or devices. For example, storage device 4104 may include, but is not limited to, a hard drive, network drive, flash drive, magnetic disc, optical disc, RAM, dynamic RAM, solid-state drive, other non-volatile and/or volatile data storage units, or a combination or sub-combination thereof. Electronic data, including data described herein, may be temporarily and/or permanently stored in storage device 4104. In some examples, data may be arranged in one or more databases residing within storage device 4104.

In certain embodiments, one or more components of configuration 100 or configuration 300 may be implemented as application 4114 installed on computing device 4100. Data representative of installed executable application 4114 may be stored within storage device 4104 and configured to direct processor 4102 (and thus any of the components of computing device 4100) to perform one or more of the operations described herein.

I/O module 4106 may include one or more I/O modules configured to receive user input and provide user output. One or more I/O modules may be used to receive input by way of a user interface provided by computing device 4100. I/O module 4106 may include any hardware, firmware, software, or combination thereof supportive of input and output capabilities. For example, I/O module 4106 may include hardware and/or software for capturing user input, including, but not limited to, a keyboard or keypad, a touchscreen component (e.g., a touchscreen display), a receiver (e.g., an RF or infrared receiver), motion sensors, a microphone, and/or one or more input buttons.

I/O module 4106 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 4108 is configured to provide graphical data to a display for presentation on a display screen. The graphical data may be representative of one or more graphical user interfaces and/or any other graphical content as may serve a particular implementation, including content of any of the exemplary graphical user interface views described herein.

Communication interface 4108 may be configured to communicate with one or more other computing devices separate from computing device 4100. Examples of communication interface 4108 include, without limitation, a wired network interface (such as a network interface card), a wireless network interface (such as a wireless network interface card), a modem, an audio/video connection, a radio frequency transceiver, and any other suitable interface.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A physical computing system allowing for blockchain data exchange related to an over-the-counter (OTC) traded product via an add-on plug-in component to a spreadsheet application comprising:
    a blockchain system that includes a plurality of distributed computing devices communicatively coupled to one another by way of a network, a blockchain, a smart contract template, and a smart contract generated based on the smart contract template, the smart contract includes executable code to facilitate, by way of the blockchain, exchanges between parties to the smart contract in relation to the OTC traded product; and
    an interface system comprising at least one computing device, the interface system communicatively coupled to the blockchain system and configured to perform a set of operations to provide an interface to the blockchain system, the set of operations comprising:
        initiating an active session with the blockchain system by interacting with a first application programming interface (API) of the blockchain system, the initiating of the active session including using a blockchain access certificate issued by a certificate authority to facilitate secure access to the blockchain system;
        receiving, during the active session, a user selection of a menu option to access information associated with a plurality of different OTC traded products that are available to be provided by way of the smart contract, the menu option integrated as the add-on plug-in component to the spreadsheet application that is executed on a user computing device and that includes a tabular graphical user interface having a plurality of cells;
        providing, for display to a user by way of the user computing device and in response to the user selection of the menu option, a catalogue list that includes the plurality of different OTC traded products that are selectable by the user, the catalogue list provided for concurrent display together with the spreadsheet application as an additional graphical user interface pane;
        receiving an additional user selection of the OTC traded product included in the plurality of different OTC traded products;
        providing, in response to the additional user selection of the OTC traded product and for display to the user by way of the user computing device within the spreadsheet application, information associated with the selected OTC traded product;
        receiving a user input from the spreadsheet application, the user input provided directly in a cell included in the plurality of cells;
        translating the user input to a call to the blockchain system; and
        issuing the call to the blockchain system;
    wherein
        the blockchain system is configured to perform, based on the call and the smart contract, an action on the blockchain that represents an exchange between the parties to the smart contract, and
        the smart contract represents a call option or a put option agreed to by the parties to the smart contract and is defined by an expiration date or an expiration price that triggers an OTC payoff.

2. The physical computing system of claim 1, wherein the interface system further comprises a second API configured to provide an interface between the first API of the blockchain system and the add-on plug-in component to the spreadsheet application.

3. The physical computing system of claim 2, wherein at least one of the add-on plug-in component to the spreadsheet application and the second API of the interface system is configured to translate the user input to the call to the blockchain system.

4. The physical computing system of claim 1, wherein the action on the blockchain comprises:
    adding, to the blockchain, data representative of the exchange between the parties to the smart contract.

5. The physical computing system of claim 4, wherein the adding of the data makes the data representative of the exchange accessible to the parties to the smart contract by way of the interface system.

6. The physical computing system of claim 1, wherein the exchange between the parties to the smart contract comprises one of:
    a placement of a new order;
    an acceptance of the new order;
    a fulfillment of the new order;
    an issuance of an invoice for the new order; and
    a payment of the invoice for the new order.

7. The physical computing system of claim 1, wherein the smart contract template is configured to be used by users of the blockchain system to create additional smart contracts including executable code to facilitate exchanges between additional parties.

8. The physical computing system of claim 1, wherein the set of operations further comprises:
    prior to the generation of the smart contract based on the smart contract template:
        receiving, from the spreadsheet application executed on the user computing device, a request to access the smart contract template;
        accessing data representative of the smart contract template from the blockchain system;

providing, to the spreadsheet application executed on the user computing device in response to the request to access the smart contract template, the data representative of the smart contract template;

receiving, byway of the spreadsheet application executed on the user computing device, an additional request to generate the smart contract based on the smart contract template, the additional request to generate the smart contract including terms for the smart contract as agreed to by the parties to the smart contract; and directing the blockchain system to generate the smart contract based on the smart contract template and the terms for the smart contract as agreed to by the parties to the smart contract.

9. A method allowing for blockchain data exchange related to an over-the-counter (OTC) traded product via an add-on plug-in component to a spreadsheet application, the method comprising:

initiating, by a computing system, an active session with a blockchain system by interacting with a first application programming interface (API) of the blockchain system, the initiating of the active session including using a blockchain access certificate issued by a certificate authority to facilitate secure access to the blockchain system;

receiving, by the computing system and during the active session, a user selection of a menu option to access information associated with a plurality of different OTC traded products that are available to be provided by way of a smart contract, the menu option integrated as the add-on plug-in component to the spreadsheet application that is executed on a computing system and that includes a tabular graphical user interface having a plurality of cells;

providing, for display to a user by way of the computing system and in response to the user selection of the menu option, a catalogue list that includes the plurality of different OTC traded products that are selectable by the user, the catalogue list provided for concurrent display together with the spreadsheet application as an additional graphical user interface pane;

receiving, by the computing system, an additional user selection of the OTC traded product included in the plurality of different OTC traded products;

providing, by the computing system in response to the additional user selection of the OTC traded product and for display to the user by way of the computing system, information associated with the selected OTC traded product;

receiving, by the computing system, a user input by way of the spreadsheet application, the user input provided directly in a cell included in the plurality of cells;

translating, by the computing system, the user input to a call to the blockchain system that includes a plurality of distributed computing devices communicatively coupled to one another by way of a network, a blockchain, a smart contract template, and the smart contract generated based on the smart contract template, the smart contract including executable code to facilitate, by way of the blockchain, exchanges between parties to the smart contract in relation to the OTC traded product;

issuing, by the computing system, the call to the blockchain system; and performing, by the computing system and based on the call and the smart contract, an action on the blockchain that represents an exchange between the parties to the smart contract, wherein the smart contract represents a call option or a put option agreed to by the parties to the smart contract and is defined by an expiration date or an expiration price that triggers an OTC payoff.

10. The method of claim 9, further comprising:

prior to the generation of the smart contract based on the smart contract template:

receiving, by the computing system and by way of the spreadsheet application executed on the computing system, a request to access the smart contract template;

accessing, by the computing system, data representative of the smart contract template from the blockchain system;

providing, by the computing system and to the spreadsheet application executed on the computing system in response to the request to access the smart contract template, the data representative of the smart contract template;

receiving, by the computing system and by way of the spreadsheet application executed on the computing system, an additional request to generate the smart contract based on the smart contract template, the additional request to generate the smart contract including terms for the smart contract as agreed to by the parties to the smart contract; and directing, by the computing system, the blockchain system to generate the smart contract based on the smart contract template and the terms for the smart contract as agreed to by the parties to the smart contract.

11. The method of claim 9, wherein the performing of the action on the blockchain comprises:

adding, by the computing device to the blockchain, data representative of the exchange between the parties to the smart contract to make the data representative of the exchange accessible to the parties to the smart contract.

12. A non-transitory computer-readable medium storing instructions executable by a processer to perform operations to facilitate blockchain data exchange related to an over-the-counter (OTC) traded product via an add-on plug-in component to a spreadsheet application, the operations comprising:

initiating an active session with a blockchain system by interacting with first application programming interface (API) of the blockchain system, the initiating of the active session including using a blockchain access certificate issued by a certificate authority to facilitate secure access to the blockchain system;

receiving, during the active session, a user selection of a menu option to access information associated with a plurality of different over-the-counter (OTC) traded products that are available to be provided by way of a smart contract, the menu option integrated as the add-on plug-in component to the spreadsheet application that is executed on a user computing device and that includes a tabular graphical user interface having a plurality of cells;

providing, for display to a user by way of the user computing device and in response to the user selection of the menu option, a catalogue list that includes the plurality of different OTC traded products, the catalogue list provided for concurrent display together with the spreadsheet application as an additional graphical user interface pane;

receiving an additional user selection of the OTC traded product included in the plurality of different OTC traded products;

providing, in response to the additional user selection of the OTC traded product and for display to the user by way of the user computing device, information associated with the selected OTC traded product;

receiving a user input by way of the spreadsheet application, the user input provided directly in a cell included in the plurality of cells;

translating the user input to a call to the blockchain system that includes a plurality of distributed computing devices communicatively coupled to one another by way of a network, a blockchain, a smart contract template, and the smart contract generated based on the smart contract template, the smart contract including executable code to facilitate, byway of the blockchain, exchanges between parties to the smart contract in relation to the OTC traded product;

issuing the call to the blockchain system; and performing, based on the call and the smart contract, an action on the blockchain that represents an exchange between the parties to the smart contract, wherein the smart contract represents a call option or a put option agreed to by the parties to the smart contract and is defined by an expiration date or an expiration price that triggers an OTC payoff.

13. The non-transitory computer-readable medium of claim 12, the operations further comprising:

prior to the generation of the smart contract based on the smart contract template:

receiving, byway of the spreadsheet application executed on the user computing device, a request to access the smart contract template;

accessing data representative of the smart contract template from the blockchain system;

providing, to the spreadsheet application executed on the user computing device in response to the request to access the smart contract template, the data representative of the smart contract template;

receiving, byway of the spreadsheet application executed on the user computing device, an additional request to generate the smart contract based on the smart contract template, the additional request to generate the smart contract including terms for the smart contract as agreed to by the parties to the smart contract; and directing the blockchain system to generate the smart contract based on the smart contract template and the terms for the smart contract as agreed to by the parties to the smart contract.

14. The non-transitory computer-readable medium of claim 12, wherein the performing of the action on the blockchain comprises:

adding, to the blockchain, data representative of the exchange between the parties to the smart contract to make the data representative of the exchange accessible to the parties to the smart contract.

* * * * *